United States Patent
Jain et al.

(10) Patent No.: US 10,999,223 B1
(45) Date of Patent: May 4, 2021

(54) INSTANTANEOUS GARBAGE COLLECTION OF NETWORK DATA UNITS

(71) Applicant: Innovium, Inc., San Jose, CA (US)

(72) Inventors: Ajit Kumar Jain, Cupertino, CA (US); Mohammad Kamel Issa, Los Altos, CA (US)

(73) Assignee: Innovium, Inc., San Jose, CA (US)

( * ) Notice: Subject to any disclaimer, the term of this patent is extended or adjusted under 35 U.S.C. 154(b) by 101 days.

(21) Appl. No.: 16/378,220

(22) Filed: Apr. 8, 2019

(51) Int. Cl.
*H04L 12/883* (2013.01)
*G06F 12/02* (2006.01)

(52) U.S. Cl.
CPC ...... *H04L 49/9015* (2013.01); *G06F 12/0253* (2013.01); *G06F 2212/154* (2013.01)

(58) Field of Classification Search
CPC ............. H04L 49/9015; G06F 12/0253; G06F 2212/154
See application file for complete search history.

(56) References Cited

U.S. PATENT DOCUMENTS

| | | | | |
|---|---|---|---|---|
| 6,115,775 A * | 9/2000 | Ross | ..................... | G06F 13/128 710/260 |
| 6,628,649 B1 * | 9/2003 | Raj | ......................... | H04L 45/10 370/360 |
| 7,127,547 B2 * | 10/2006 | Utley | ...................... | H04L 49/90 711/5 |
| 7,162,551 B2 * | 1/2007 | Zievers | ............... | G06F 12/0802 710/29 |
| 7,535,913 B2 * | 5/2009 | Minami | .................. | H04L 29/06 370/401 |
| 7,653,072 B2 * | 1/2010 | Deforche | ................ | H04L 49/30 370/401 |
| 8,085,794 B1 * | 12/2011 | Niver | ...................... | H04L 45/54 370/401 |
| 8,520,522 B1 | 8/2013 | Goldman et al. | | |
| 10,523,576 B1 * | 12/2019 | Matthews | ........... | H04L 49/9015 |
| 2003/0095558 A1 | 5/2003 | Chung et al. | | |
| 2003/0120884 A1 | 6/2003 | Koob et al. | | |
| 2005/0025140 A1 * | 2/2005 | Deforche | ............ | H04L 49/9094 370/363 |

(Continued)

OTHER PUBLICATIONS

U.S. Appl. No. 16/029,392, Advisory Action dated Jul. 14, 2020.

(Continued)

*Primary Examiner* — Habte Mered
(74) *Attorney, Agent, or Firm* — Wong & Rees LLP; Karl T. Rees

(57) ABSTRACT

Approaches, techniques, and mechanisms are disclosed for reutilizing discarded link data in a buffer space for buffering data units in a network device. Rather than wasting resources on garbage collection of such link data when a data unit is dropped, the link data is used as a free list that indicates buffer entries in which new data may be stored. In an embodiment, operations of the buffer may further be enhanced by re-using the discarded link data as link data for a new data unit. The link data for a formerly buffered data unit may be assigned exclusively to a new data unit, which uses the discarded link data to determine where to store its constituent data. As a consequence, the discarded link data actually serves as valid link data for the new data unit, and new link data need not be generated for the new data unit.

21 Claims, 18 Drawing Sheets

(56) References Cited

U.S. PATENT DOCUMENTS

| | | | |
|---|---|---|---|
| 2005/0086416 A1* | 4/2005 | Utley | H04L 49/90 |
| | | | 711/5 |
| 2005/0100020 A1 | 5/2005 | Hata et al. | |
| 2005/0111353 A1* | 5/2005 | Zievers | G06F 13/1673 |
| | | | 370/229 |
| 2006/0267720 A1* | 11/2006 | Malingowski | H01H 85/303 |
| | | | 337/206 |
| 2013/0121138 A1* | 5/2013 | Soon | H04L 45/00 |
| | | | 370/225 |
| 2014/0146823 A1* | 5/2014 | Angst | H04L 12/4675 |
| | | | 370/401 |
| 2015/0063367 A1* | 3/2015 | Griswold | H04L 49/9063 |
| | | | 370/412 |
| 2015/0356007 A1 | 12/2015 | Bacon et al. | |
| 2016/0226797 A1* | 8/2016 | Aravinthan | H04L 49/251 |
| 2017/0344473 A1 | 11/2017 | Gidra et al. | |
| 2017/0353403 A1* | 12/2017 | Zemach | H04L 49/9042 |
| 2019/0265909 A1 | 8/2019 | Frolikov | |

OTHER PUBLICATIONS

U.S. Appl. No. 16/029,392, Final Office Action dated May 14, 2020.
U.S. Appl. No. 16/029,441, Notice of Allowance dated Aug. 21, 2019.
U.S. Appl. No. 16/029,392, Non-Final Office Action dated Dec. 30, 2019.
U.S. Appl. No. 16/029,392, Notice of Allowance dated Aug. 11, 2020.

* cited by examiner

FIG. 9C
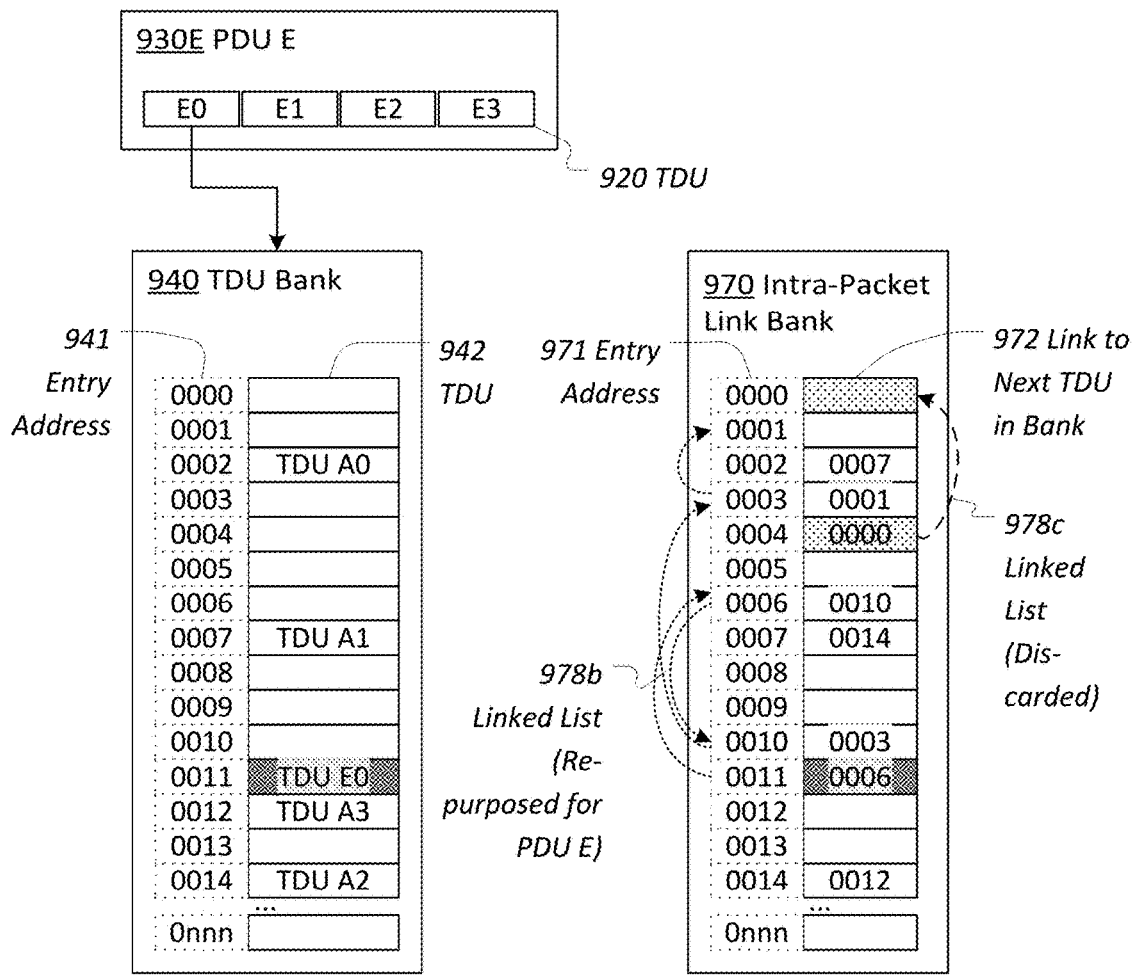
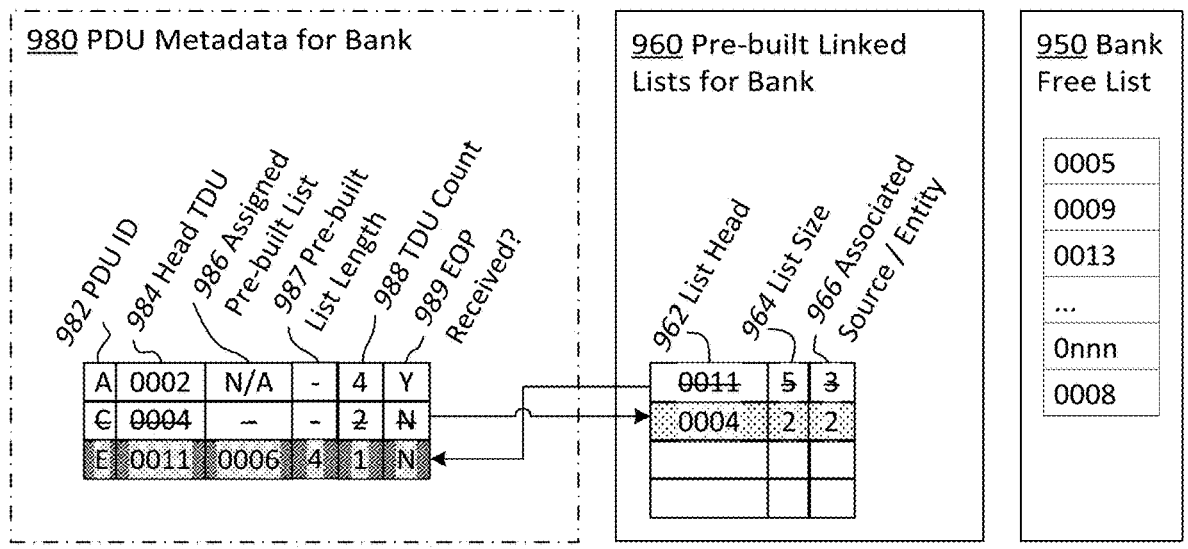

FIG. 9D
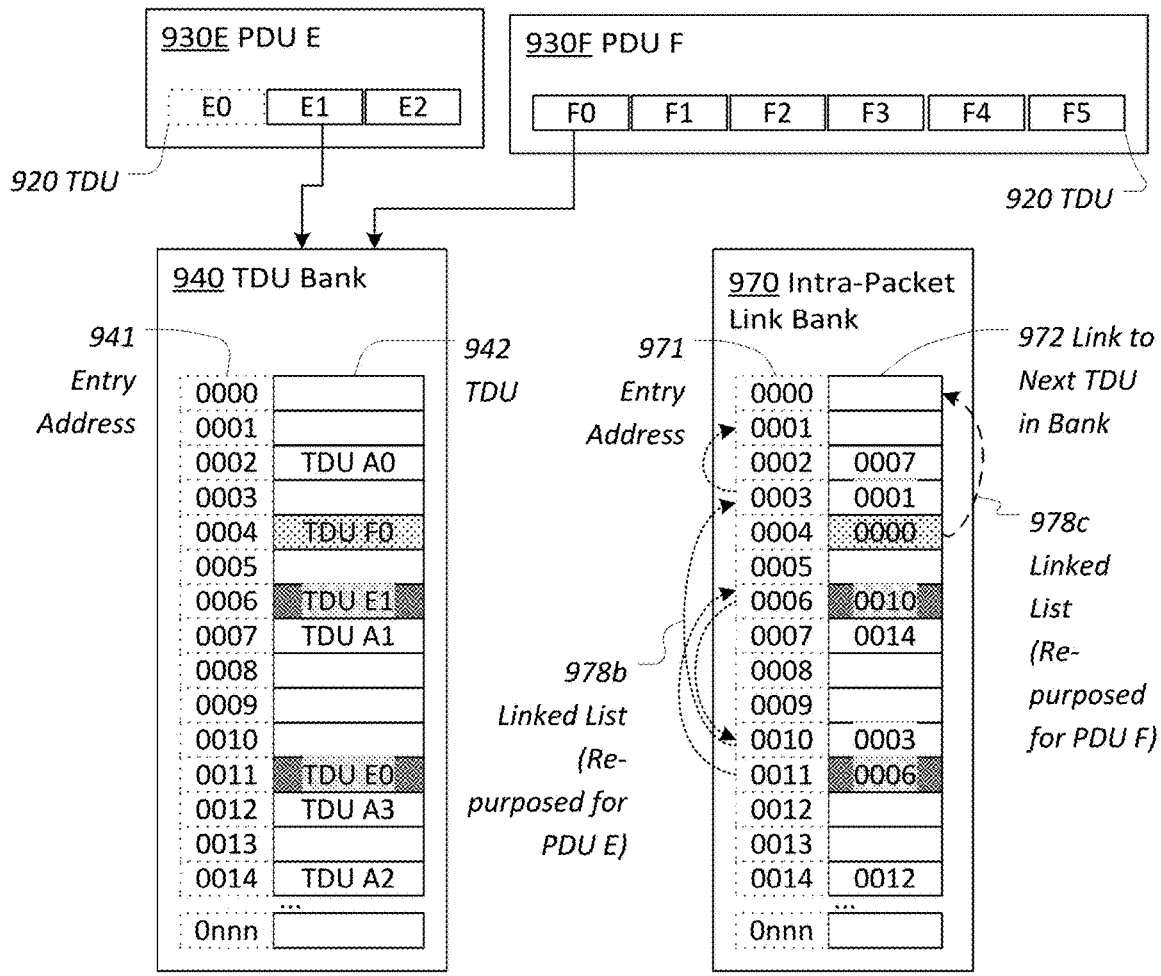
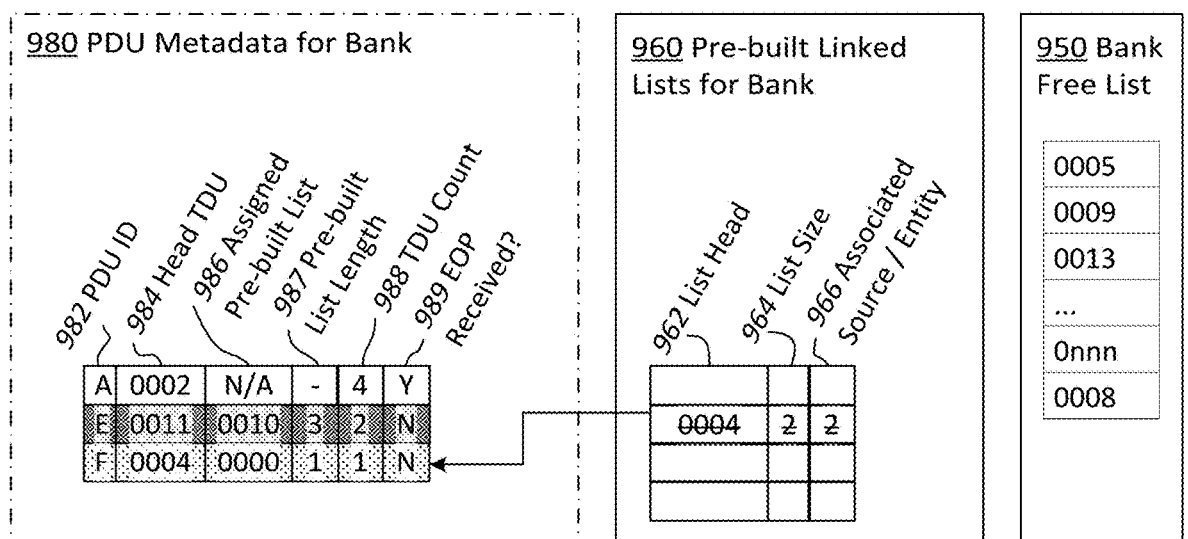

FIG. 9E
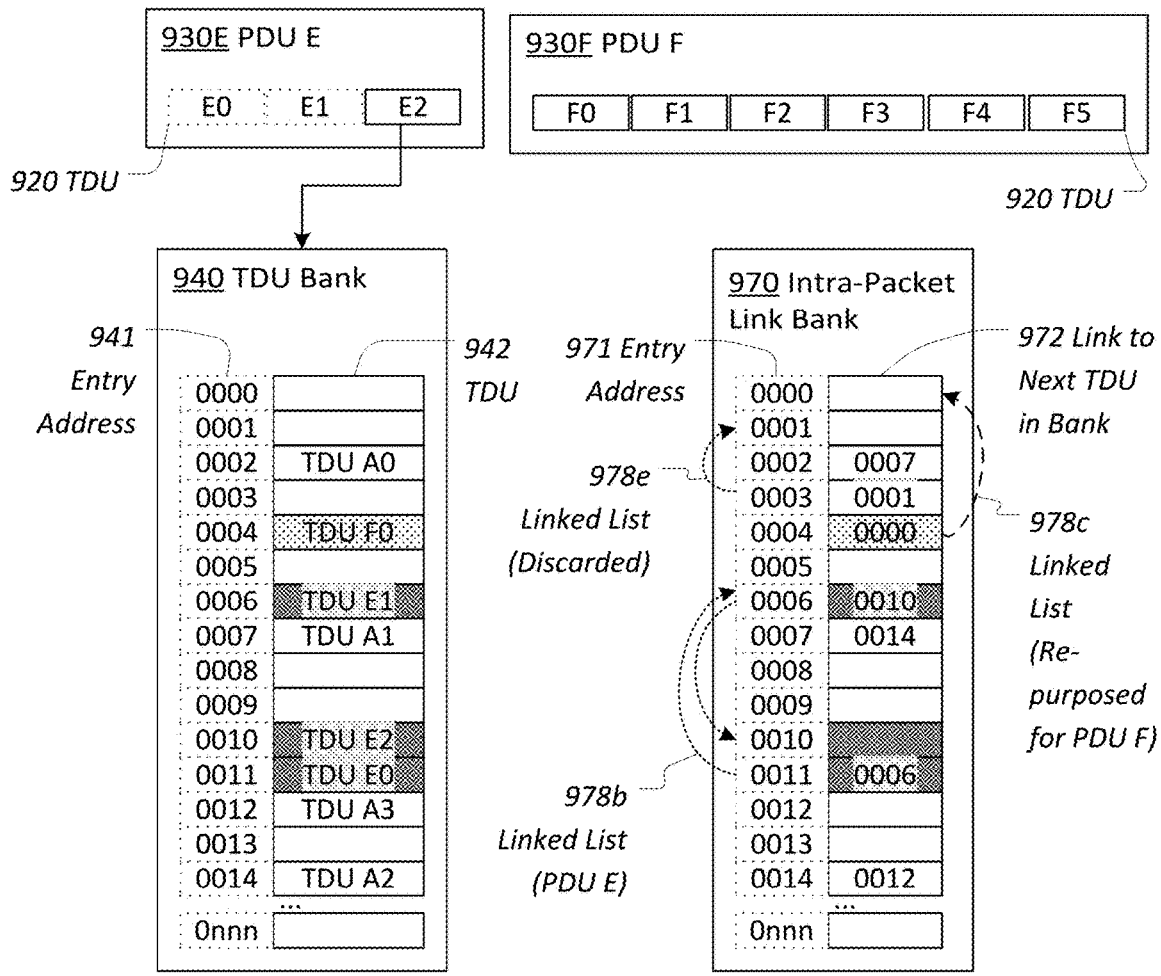
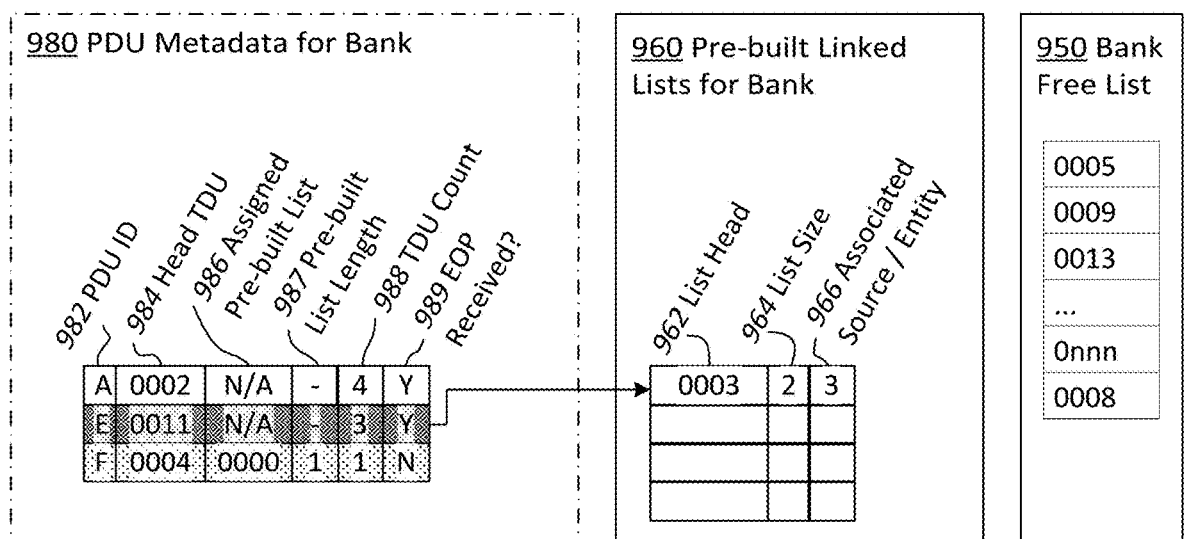

FIG. 9F
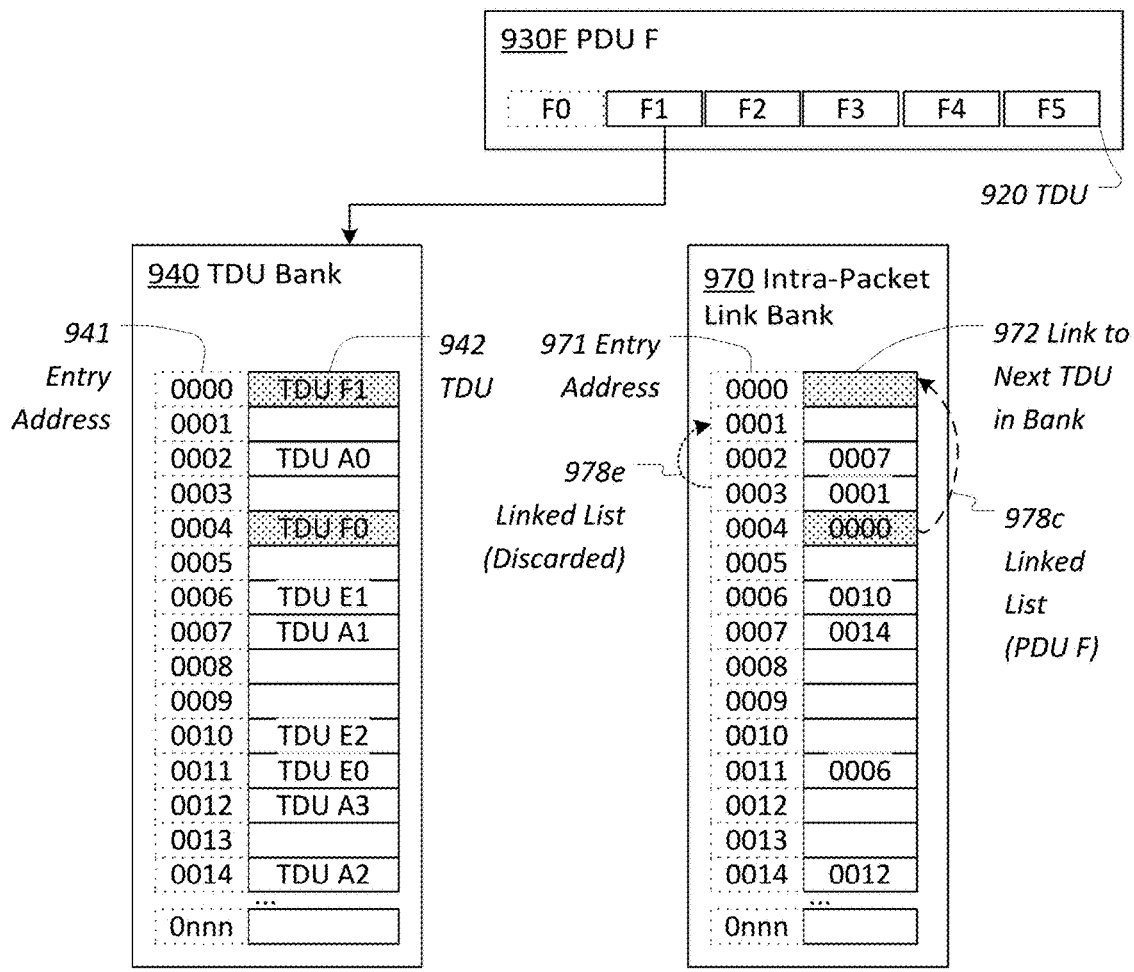
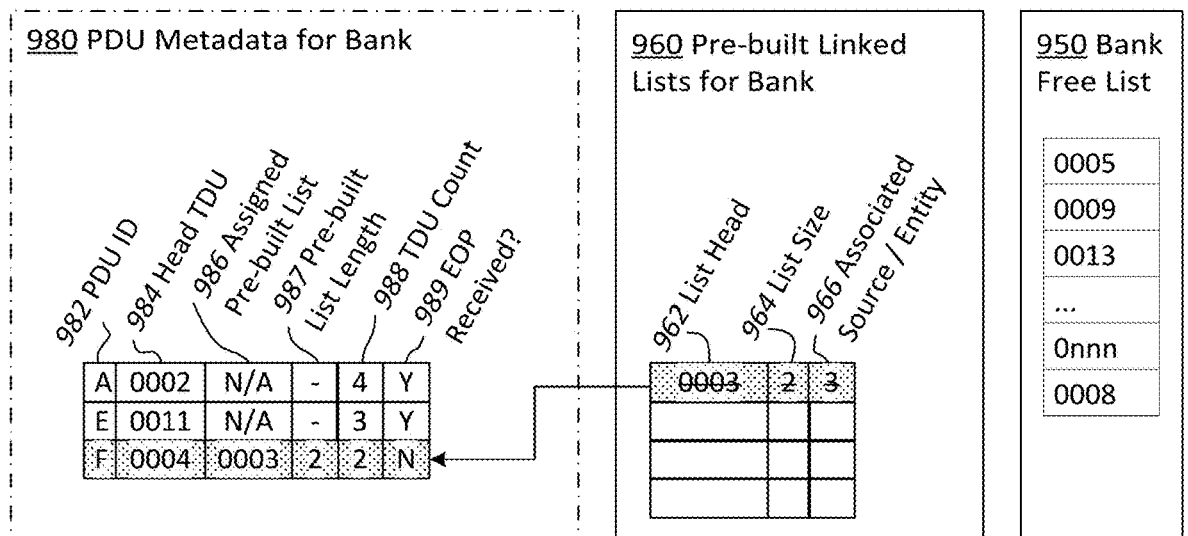

US 10,999,223 B1

INSTANTANEOUS GARBAGE COLLECTION OF NETWORK DATA UNITS

TECHNICAL FIELD

Embodiments relate generally to data buffering, and, more specifically, to garbage collection techniques for buffered data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

A network device may include any number of internal hardware and/or software components configured to handle the movement of data between processing components within the device and, eventually, out of the device. On account of resource constraints and other issues, network devices often temporarily store significant numbers of data units until the necessary components become available to process the data units. The storage media in which these data units are temporarily stored are often referred to as data buffers (or, simply, "buffers"). It is generally desirable to optimize the components of a network device, including the buffers, so that the device quickly determines where to send and/or store data for processing, and to expediently send and/or store that data to the appropriate destination once determined.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 3 illustrates different levels of data units that a network node may act upon or with respect to;

FIGS. 9A-9I illustrate example contents of a simple buffer space as they change over time in response to example buffer assignment and garbage collection operations in accordance to techniques described herein;

DETAILED DESCRIPTION

Figure 1:
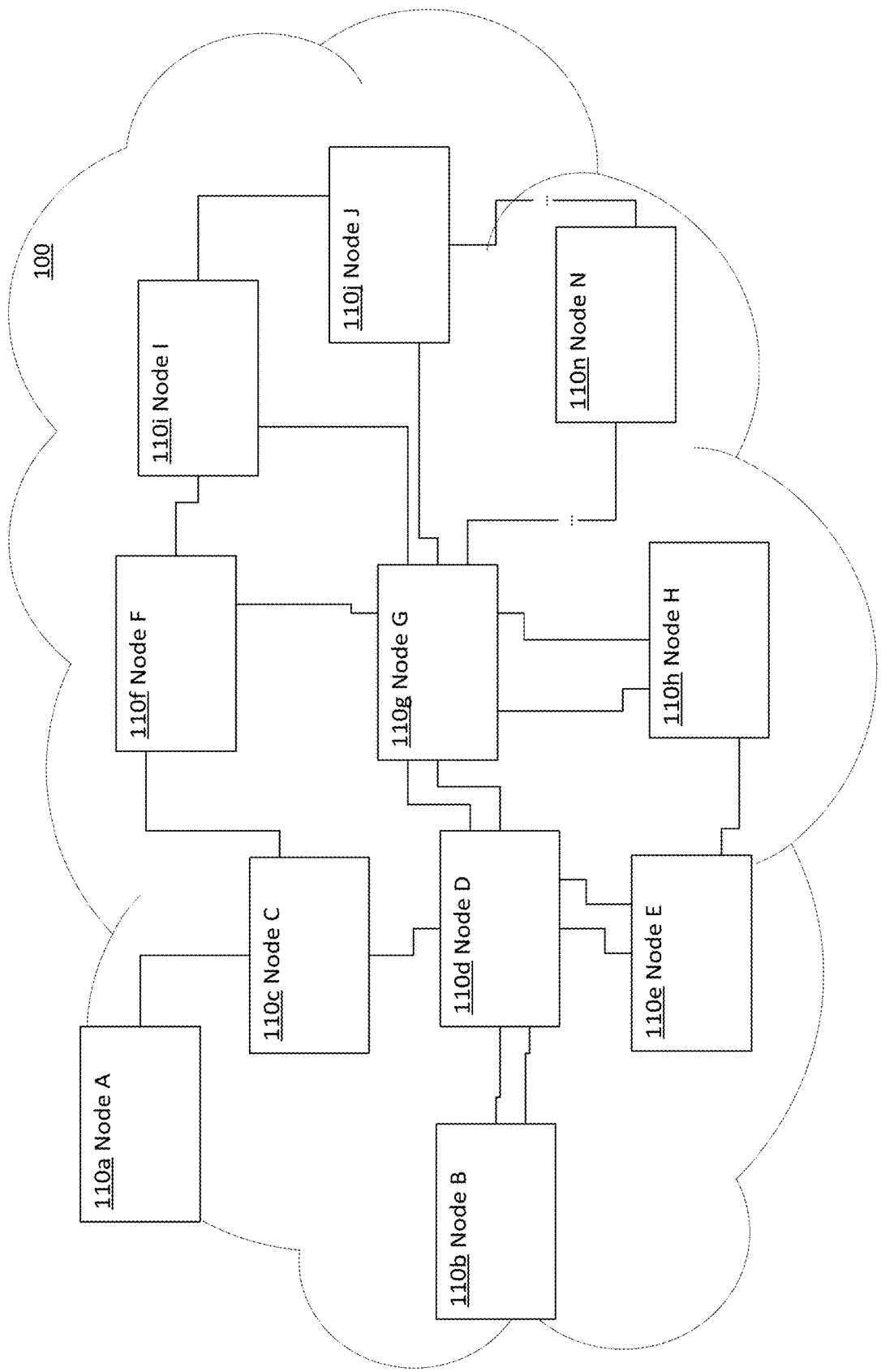
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
  2.1. Data Units
  2.2. Network Paths
  2.3. Network Device
  2.4. Ports
  2.5. Packet Processors
  2.6. Buffers
  2.7. Queues
  2.8. Traffic Management
  2.9. Forwarding Logic
  2.10. Instantaneous Garbage Collection
  2.11. Miscellaneous
3.0. Functional Overview
  3.1. Enqueue Process
  3.2. Repurposing Discarded Linked Lists as Free Lists
  3.3. Replenishing Bank Free Lists with Bank Free Lists
  3.4. Bypassing the Bank Free List Using Double-Ported Memory
4.0. Implementation Example
5.0. Example Embodiments
6.0. Implementation Mechanism—Hardware Overview
7.0. Extensions and Alternatives

1.0. General Overview

Approaches, techniques, and mechanisms are disclosed for reutilizing discarded link data in a buffer space for buffering data units in a network device. Rather than wasting resources on garbage collection of such link data when a data unit is dropped, the link data is used as a free list that indicates buffer entries in which new data may be stored. In an embodiment, operations of the buffer may further be enhanced by re-using the discarded link data as link data for a new data unit. The link data for a formerly buffered data unit may be assigned exclusively to a new data unit, which uses the discarded link data to determine where to store its constituent data. As a consequence, the discarded link data actually serves as valid link data for the new data unit, and new link data need not be generated for the new data unit.

In an embodiment, link data may take the form of a linked list, in which each node is an entry in an intra-packet link memory bank. Each node also corresponds to a different buffer entry in a buffer memory bank. Data units referred to as Protocol Data Units ("PDUs") are received at the buffering component in distinct subunits referred to as Transport Data Units ("TDUs"). Each buffer entry stores a TDU. Each buffer entry that stores a TDU in a given PDU is linked in the intra-packet memory by a linked list of intra-packet entries. The head pointer of the intra-packet linked list for a PDU is recorded, and used to locate the TDUs of the PDU when it is time to release the PDU. If the PDU is dropped before it has been released or even fully received, the intra-packet linked list is considered to be discarded. However, the discarded linked list may be reclaimed as a pre-built linked list by adding its head pointer to a pre-built linked list table, signifying that the buffer entries indicated by the linked list are now available for storing new data. In an embodiment, other similar structures, such as receive contexts, may also or instead be reclaimed as pre-built linked lists.

The pre-built linked lists may be utilized in various manners. For instance, when buffer assignment logic needs to assign a buffer entry to store a TDU, the buffer entry is usually taken from a bank free list, but may instead be taken from a pre-built linked list. As another example, bank free lists and pre-built linked lists may both be stored in an intra-packet link memory, and pre-built linked lists may be converted to bank free lists, or linked to bank free lists, when needed. As yet another example, a pre-built linked list may be assigned to a new PDU, and the TDUs of the new PDU may be stored at the buffer entries indicated by the pre-built linked list in such a manner that the pre-built linked list may be reutilized as the intra-packet linked list for the new PDU.

In an embodiment, a pre-built linked list and/or bank free list may be associated with a source port or other entity within a network device. The pre-built linked list and/or bank free list may only be used for data units associated with the same entity. In another embodiment, data units are assigned a buffer entry in a manner that prefers a pre-built linked list or bank free list associated with the same entity as the data unit, but other pre-built linked lists or bank free lists may be utilized if needed.

In an embodiment, intra-packet linked lists are stored in a double-ported intra-packet link memory. When a TDU is dequeued, instead of writing its buffer entry address to a bank free list, its buffer entry address is immediately assigned to a new TDU, bypassing the bank free list. In this manner, the number of memory operations needed for the dequeuing the old TDU and buffering the new TDU is reduced.

In other aspects, the inventive subject matter encompasses computer apparatuses and/or computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g. a TCP segment) to a second node 110 over a path that includes an intermediate node 110. This unit of data will be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g. frames and/or cells) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

Figure 3:
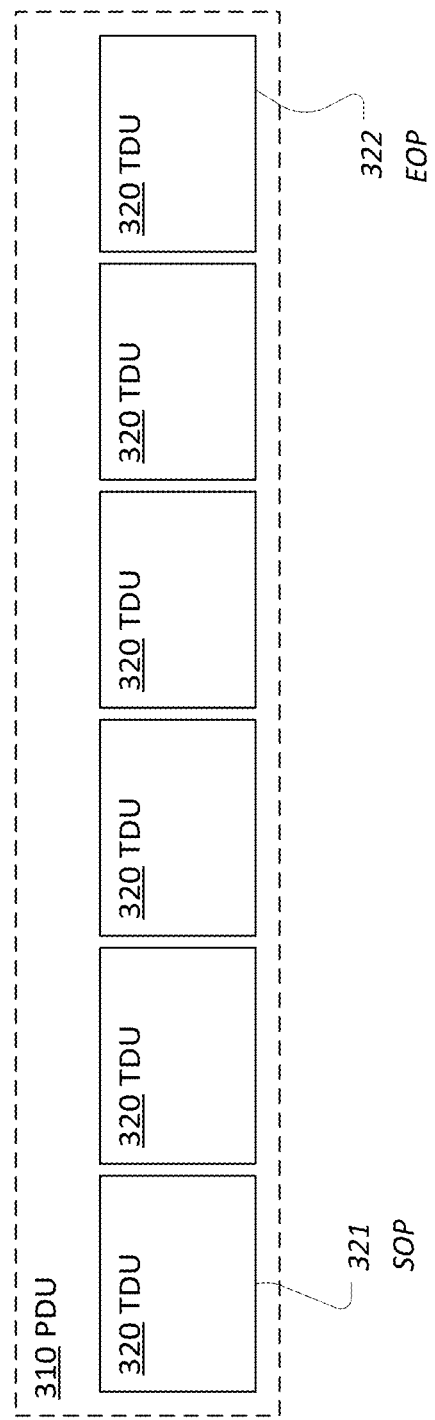

A node 110 may operate on network data at several different layers, and therefore view the same data as belonging to several different types of data units. FIG. 3 which illustrates different levels of data units that a network node may act upon or with respect to, according to an embodiment.

At a higher level, a node 110 may view data as belonging to protocol data units ("PDUs") 310 of a certain type, such as packets or data units at any other suitable network level. The node 110 need not necessarily ever assemble the data in a PDU 310 together, but rather may in an embodiment act upon constituent portions of the PDU 310, which may be linked together by identifiers, linked lists, or other suitable constructs. These portions are referred to herein as transport data units ("TDUs") 320. For instance, if the PDU 310 is a packet, the TDU 320 might be one or more cells or frames. The first TDU 320 in a PDU 310 is referred to as the start-of-packet ("SOP") 321, while the last TDU 320 in the PDU 310 is referred to as the end-of-packet ("EOP") 322.

Generally speaking, the TDU is the largest contiguous unit of data that certain internal components of a node 110 are configured to communicate between each other in a given period of time. For instance, a node 110 may have a traffic manager that is capable of receiving no more than a single TDU 320 from each interface during a single clock cycle. Additionally, in an embodiment, the contiguous portions of data sent by each port of a node 110 in a given period of time may be no larger than a TDU 320. In an embodiment, each TDU 320 is of a fixed size, except for the last TDU 320 in a PDU 310, which may be of a size less than the fixed size.

In some embodiments, for physical storage purposes, a TDU 320 may further be divided into chunks referred to as storage data units ("SDUs"), though in other embodiments, no such further division is needed.

In an embodiment, TDU (and SDU) boundaries may be relative to the component acting upon the data. That is, for example, a node 110 whose traffic manager is configured to use TDUs of a first size may further include other components configured to communicate or buffer data units of sizes other than the first size.

For convenience, many of the techniques described in this disclosure are described with respect to embodiments where the PDUs are IP packets in a L3 (level 3) network, and the TDUs are the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110*b*) may send data units to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
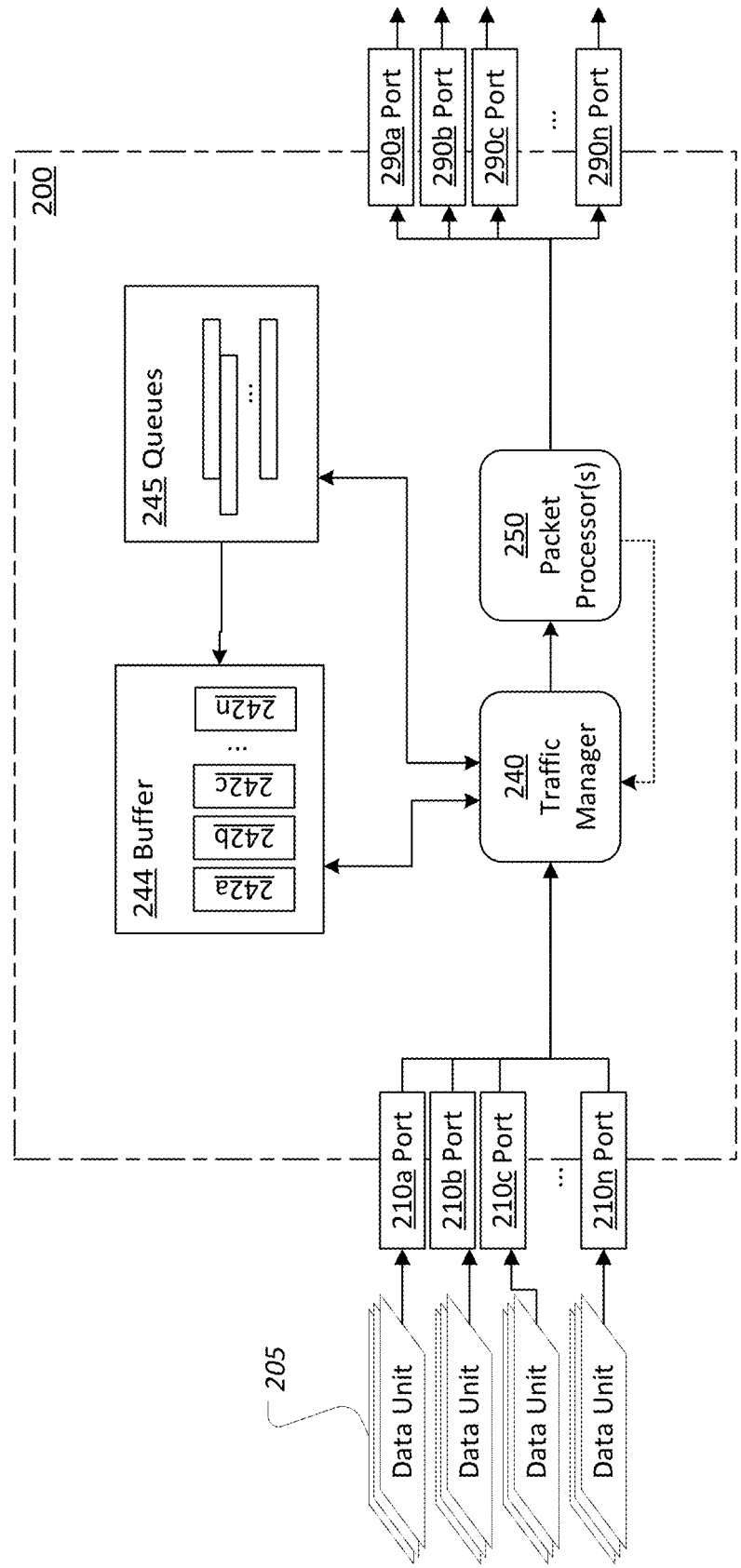
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered by an arbiter until the data unit 205 can be processed by an ingress packet processor 250, and then delivered to an interconnect. From the interconnect, the data unit 205 may be forwarded to a traffic manager 240. The traffic manager 240 may store the data unit 205 in a buffer 244 and assign the data unit 205 to a queue 245. The traffic manager 240 manages the flow of the data unit 205 through the queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter from which the data unit 205 is finally forwarded out another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210*a-n*, are inbound ("ingress") ports by which data units referred to herein as data units 205 are received over a network, such as network 110. Ports 290, including ports 290*a-n*, are outbound ("egress") ports by which at least some of the data units 205 are sent out to other destinations within the network, after having been processed by the network device 200.

Data units 205 may be of any suitable PDU type, such as packets, cells, frames, etc. In an embodiment, data units 205 are packets. However, the individual atomic data units upon which the depicted components may operate may be actually be subunits of the data units 205, such as the previously depicted TDU 320. For example, data units 205 may be received, acted upon, and transmitted at a cell or frame level. These cells or frames may be logically linked together as the data units 205 (e.g. packets) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 250. On the other end, an egress packet processor 250 may input data units serially into another SerDes block, which outputs the data units in parallel to ports 290.

2.5. Packet Processors

A device 200 comprises one or more packet processing components 250 that collectively implement forwarding logic by which the device 200 is configured to determine how to handle each data unit 205 that the device 200 receives. These packet processors 250 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 250 configured to perform any number of processing tasks.

In an embodiment, the packet processors 250 within a device 200 may be arranged such that the output of one packet processor 250 may, eventually, be inputted into another packet processor 250, in such a manner as to pass data units 205 from certain packet processor(s) 250 to other packet processor(s) 250 in a sequence of stages, until finally disposing of the data units 205 (e.g. by sending the data units 205 out an egress port 290, "dropping" the data units 205, etc.). The exact set and/or sequence of packet processors 250 that process a given data unit 205 may vary, in some embodiments, depending on the attributes of the data unit 205 and/or the state of the device 200. There is no limit to the number of packet processors 250 that may be chained together in such a manner.

Based on decisions made while processing a data unit 205, a packet processor 250 may, in some embodiments, and/or for certain processing tasks, manipulate a data unit 205 directly. For instance, the packet processor 250 may add, delete, or modify information in a data unit header or payload. In other embodiments, and/or for other processing tasks, a packet processor 250 may generate control information that accompanies the data unit 205, or is merged with the data unit 205, as the data unit 205 continues through the device 200. This control information may then be utilized by other components of the device 200 to implement decisions made by the packet processor 250.

In an embodiment, a packet processor 250 need not necessarily process an entire data unit 205, but may rather only receive and process a subunit of a data unit 205, such as a TDU comprising header information for the data unit. For instance, if the data unit 205 is a packet comprising multiple cells, the first cell, or a first subset of cells, might be forwarded to a packet processor 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 250 or an egress packet processor 250. Generally, an ingress processor 250 resolves destinations for a traffic manager 240 to determine which ports 290 and/or queues 245 a data unit 205 should depart from. There may be any number of ingress processors 250, including just a single ingress processor 250.

In an embodiment, an ingress processor 250 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 250 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by the packet processor(s) 250 at the same time, various components of device 200 may temporarily store data units 205 in memory structures collectively referred to as a buffer space, or buffer 244, while the data units 205 are waiting to be processed. For example, a certain packet processor 250 may only be capable of processing a certain number of data units 205, or portions of data units 205, in a given clock cycle, meaning that other data units 205, or portions of data units 205, destined for the packet processor 250 must either be ignored (i.e. dropped) or stored. At any given time, a large number of data units 205 may be stored in the buffers 244 of the device 200, depending on network traffic conditions.

A device 200 may include a variety of buffers 244, each utilized for varying purposes and/or components. Generally, a data unit 205 awaiting processing by a component is held in a buffer 244 associated with that component until the data unit 205 is "released" to the component for processing.

Buffer Space Components

A buffer space 244 comprises many addressable "slots" or "entries" 242 (e.g. rows, columns, etc.) in which data units 205, subunits, linking data, or other types of data, may be stored. The size of an entry 242 may vary depending on what data is stored and on the embodiment. For instance, in an embodiment, a buffer 244 comprises a set of entries 242 configured to store TDUs, each entry 242 storing one TDU. In another embodiment, a TDU may span multiple entries 242 in such a set, and instead each entry 242 is said to store an SDU.

A buffer 244 may be implemented using any number of distinct banks of memory in which the entries 242 are found. Each bank may be a portion of any type of memory, including volatile memory and/or non-volatile memory. The size of each entry 242 in a given bank is known as the "width" of the bank, while the number of entries 242 in the bank is known as the "depth" of the bank 242. The number of banks may vary depending on the embodiment.

Each bank may have associated access limitations. For instance, a bank may be implemented using single-ported memories that may only be accessed once in a given time slot (e.g. clock cycle). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs. In an embodiment, each bank, whether logical or physical, is capable of being accessed concurrently with each other bank in a same clock cycle, though full realization of this capability is not necessary.

Figure 4:
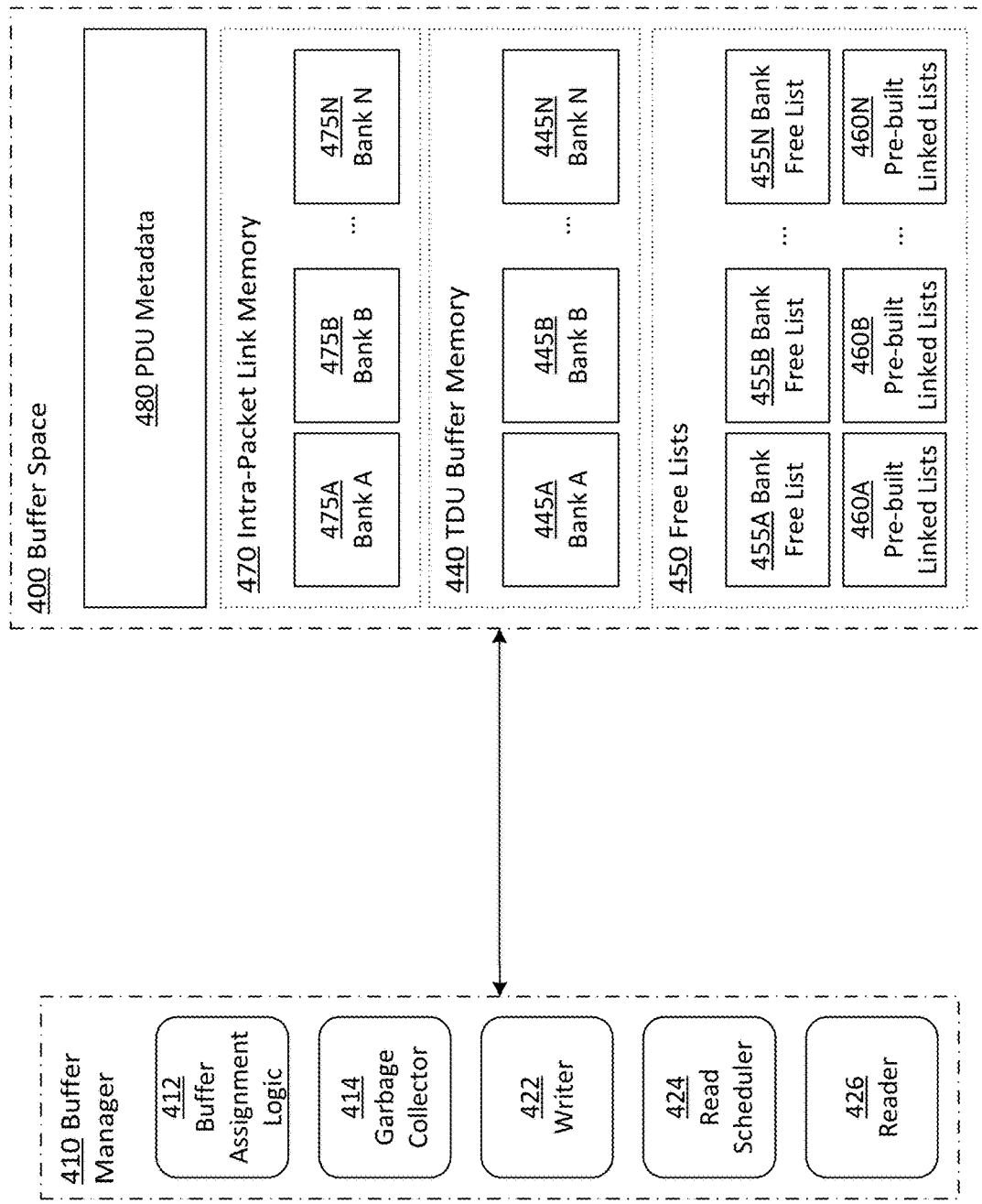
FIG. 4 illustrates an example buffer space and associated buffer manager.

Examples of such banks are found in FIG. 4. FIG. 4 illustrates an example buffer space 400 and associated buffer manager 410, according to an embodiment. Buffer space 400 is an example of buffer space 244, though buffer space 400 may be utilized in other contexts as well. Buffer space 400 includes TDU buffer banks 445a-n (collectively "TDU banks 445"), whose constituent entries store TDUs. The entries within a TDU bank may thus also be referred to as "TDU entries." There may be any number of TDU banks 445, including, in some embodiments, just one TDU bank 445. Collectively, TDU banks 445 form a TDU buffer memory 440.

Each TDU stored in the TDU buffer memory 460 belongs to a PDU. However, the TDUs that belong to a PDU may not necessarily be stored adjacent to each other. If one wishes to reconstruct a PDU based on the buffered TDUs, one would be unable to do so using the TDU buffer memory 460 alone. Therefore, buffer space 460 further stores linking data that indicates which TDUs belong to a given PDU. This linking data is stored in entries within an intra-packet link memory 470, comprising intra-packet banks 475a-n (collectively "intra-packet banks 475"), and is thus also referred to as intra-packet link data.

In an embodiment, the linking data may be stored in the form of linked lists. Each linked list is specific to a PDU, and comprises a set of nodes. Each node corresponds to a different TDU in the PDU, and indicates a location of an entry within the TDU buffer memory 440 in which this TDU may be found. Each node may further point to another node in the set. The nodes may thus form a chain, in which all nodes point to another node, except for the last node. In an embodiment, the nodes are linked together in an order that reflects their relative positions within the PDU, such that the node for a TDU that is found earlier in the PDU appears earlier in the linked list than a node for a TDU that is found later in the PDU.

The linked lists may be represented within the intra-packet link memory 470 in any suitable form. For example, in an embodiment, each node is represented by a different entry within an intra-packet link bank 475 (i.e. an "intra-packet entry"). Moreover, the location of the corresponding TDU may be indicated in any suitable manner. For instance, the intra-packet link entry may directly specify the address or addresses of the entry or entries in which the TDU is stored.

Or, the intra-packet link entry may indicate the location of the corresponding TDU implicitly, a result of a one-to-one correspondence between TDU entries and intra-packet entries. For example, the buffer space 400 may be arranged such that the relative address of a given intra-packet link entry, and the number of the intra-packet bank 475 in which the intra-packet link entry is found, are the same as the relative address of the TDU entry, and bank 445, in which the corresponding TDU is found. Thus, for example, for a certain TDU stored in address 123 of TDU bank 445b, the corresponding linking data (i.e. the corresponding node of the intra-packet linked list) may be found at address 123 of intra-packet bank 475b.

In a similar embodiment, the relative address (and possibly even the bank 445) of the TDU entry that stores a corresponding TDU might not necessarily be the same as the relative address of the intra-packet entry that stores its linking data, but may nonetheless be readily derivable from the address of the intra-packet entry via some predictable function or other mapping. In embodiments where the address of a corresponding TDU is indicated implicitly by the address of the intra-packet entry, the address of an intra-packet entry is said to correspond to the address of the TDU entry that stores TDU to which the intra-packet entry corresponds, regardless of whether the relative addresses are the same.

In an embodiment, each TDU bank 445 has a separate and distinct intra-packet bank 475 with which it is associated. A linked list is formed only of entries within a single intra-packet bank. Each linked list within an intra-packet bank 475 thus consists exclusively of nodes that correspond to TDUs stored within the associated TDU bank 445.

In some embodiments, all TDUs for a PDU may be stored in a single TDU bank 445, and there may thus be only a single linked list for the PDU. In other embodiments, the TDUs of a PDU may be found in two or more banks 445. In such embodiments, if a linked list can only have entries in a single intra-packet bank 475, there may be multiple linked lists for the PDU. The TDUs are still linked in such a manner that TDUs with the lower positions in the PDU appear earlier in the lists, but the linked lists may not necessarily link a TDU to the TDU that immediately follows it in the PDU, since that TDU may be stored in a different TDU bank 445. For instance, a linked list in intra-packet bank 475a might link the first, third, and sixth TDUs of a certain PDU, while a linked list in intra-packet bank 475b might link the second, fourth, and fifth TDUs of the PDU. In such embodiments, additional positional data may be stored with the linking data so as to assist reconstructing the PDU in the correct order.

In some embodiments, a device 200 may be configured to aggregate certain physical banks together into logical banks that support additional reads or writes in a time slot and/or higher write bandwidth. For instance, each TDU bank 445 may comprise multiple physical banks. In some such embodiments, the TDU may be striped across the physical banks at a same address, and thus accessed transparently via a single address. In other such embodiments, the TDU may be divided into SDUs that may be stored in any arbitrary physical bank. The physical SDU addresses may be stored in the intra-packet entry, or the TDU address indicated by the intra-packet entry may be an entry in an additional TDU-to-SDU mapping memory, where the physical SDU addresses for the TDU are listed.

For each PDU, various PDU metadata 480 is maintained. The PDU metadata 480 may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

In an embodiment, certain PDU metadata 480 may only be relevant while the PDU is still being received (i.e. before the EOP TDU for the PDU has been received and buffered). Such metadata 480 might include, for instance, the intra-packet entry address for the last TDU (if any) from the PDU that has been buffered in a bank 445, so that appropriate linking data may be written there upon writing a new a TDU for the PDU in that bank 445. Such metadata may be removed when the PDU is enqueued.

In an embodiment, PDU metadata 480 may be stored in different locations, depending on whether the PDU is still being received. For instance, while the PDU is being received, it may be stored in a "receive context," and then transferred to an "inter-packet" memory once the EOP TDU has been buffered. Optionally, the receive context may be implemented using a faster memory than the inter-packet memory.

Buffer space 400 further includes free lists 450. Free lists 450, which may be stored in any suitable structure depending on the embodiment, generally indicate entries with TDU banks 445 that are currently available for storing new TDUs. The available entries may be empty, or may store obsolete data from previously buffered TDUs that have already been released from the buffer space 400. The free lists 250 may take any suitable form, including without limitation a linked list, and be stored in any suitable memory or memories.

In an embodiment, each bank 445 and/or 475 has a bank free list 455a-n (collectively "bank free lists 455"). Where TDU entries have a one-to-one correspondence to intra-packet link entries, a single free list may indicate entries that are available in both a TDU bank 445 and its corresponding intra-packet bank 475. Alternatively, there may be a single free list for multiple or even all of the banks 455.

In an embodiment, the free lists 450 may include one or more pre-built linked lists 460a-n (collectively pre-built linked lists 460), in which each node corresponds to an available TDU entry. In some embodiments, such pre-built linked lists 460 may be utilized to facilitate more efficient garbage collection in the buffer space 400, as described in further detail in subsequent sections.

Buffer Management

Buffer space 400 may be managed by a buffer manager 410 within or connected to the component of device 200 that is utilizing the buffer space 400, such as in a traffic manager 240 or ingress arbiter. Generally, the buffer manager 410 is configured to process instructions to write or read TDUs to or from the buffer space 440. Hence, buffer manager 410 includes write logic 422 and read logic 426. In an embodiment, there may be a different instance of the write logic 422 and read logic 426 for each bank of memory inside the buffer space 400.

To avoid conflicts on account of memory access limitations for the various memories in the buffer space 400, a read scheduler 424 may schedule read operations. For instance, the read scheduler 424 may schedule read operations such that a single-ported memory bank 445 is accessed only once each clock cycle. Moreover, the read scheduler 424 may be configured to ensure that there are enough banks left unaccessed in a given clock cycle by readers 426 to allow for writer(s) 422 to write any TDUs received during that clock cycle.

Buffer manager 410 further includes buffer assignment logic 412. Buffer assignment logic 412 may, for example, be configured to identify which buffer entry or entries should be utilized to store a given TDU. Buffer assignment logic 412 may, for example, utilize a free list 450 to identify an available TDU entry or set of entries in which to store a TDU. Depending on the embodiment, the buffer assignment logic 412 may simply select the first free TDU entry in the list 450, or the buffer assignment logic 412 may select an entry in the list at random or using any other suitable algorithm. A bank free list 455 may be utilized, or, if a pre-built linked list 460 is available, an entry may be selected from a pre-built linked list 460 as described in other sections.

If there are multiple banks 445 with multiple free lists 450, buffer assignment logic 412 may first decide upon a bank 445 in which to store the TDU, and then select a TDU entry to store the TDU from a bank-specific free list 450. In some embodiments, the bank selection logic is relatively simple, in that TDUs are assigned to banks 445 randomly, using a round-robin approach, and/or based on which banks 445 can still be accessed after all scheduled read operations have been executed.

In some embodiments, data units 205 are assigned to banks 445 at least partially based on characteristics of those data units 205, such as corresponding traffic flows, destination addresses, source addresses, ingress ports, and/or other metadata. For example, different banks 445 may be utilized to store data units 205 received from different ports 210 or sets of ports 210. In an embodiment, the buffer assignment logic also or instead utilizes buffer state information, such as utilization metrics, to determine which bank 445 and/or buffer entry to assign to a data unit, or portion thereof. Other assignment considerations may include buffer assignment rules (e.g. no writing two consecutive TDUs from the same PDU to the same bank 445). The buffer assignment logic 412 marks the one or more TDU entries in which a TDU is stored as utilized (e.g. removed from a "free" list) to prevent newly received data units from overwriting TDUs that are already buffered.

The buffer assignment logic 412 may further update linking data in intra-packet link memory 470 and/or PDU metadata 480 to reflect the buffering of a new TDU for a PDU. For example, the buffer assignment logic 412 may add the address of an entry assigned to store a TDU to the tail of an intra-packet linked list for the PDU to which the TDU belongs (and/or create a new linked list if none exists). As another example, buffer assignment logic 412 may write to the PDU metadata 480 the address of the first entry in which a TDU belonging to the PDU is stored, and/or the addresses of the first entries in each bank to store a TDU for the PDU. These addresses are referred to herein as the PDU head address and the bank head addresses, respectively, the latter of which may be utilized to locate the start(s) of the intra-packet linked lists(s) for the PDU in the intra-packet link memory. When a PDU is read, the read scheduler may schedule reads of the PDU's constituent TDUs from each bank 445 by following these linked lists from start to finish.

Buffer manager 410 further comprises garbage collection logic 414. Generally, as or after a PDU is released from the buffer, or dropped or otherwise discarded, the garbage collection logic 414 makes the entry or entries in which TDUs for the PDU are stored available again for storing new TDUs. Techniques for improving the operation of the garbage collection logic 414 are described in subsequent sections.

2.7. Queues

Returning to FIG. 2, in an embodiment, to manage the order in which data units 205 are processed from buffers, various components of a device 200 may implement queueing logic. For example, the flow of data units through ingress buffers may be managed using ingress queues while the flow of data units through egress buffers may be managed using egress queues.

Each data unit 205, or the buffer locations(s) in which the data unit 205 is stored, is said to belong to one or more constructs referred to as queues 245. Typically, a queue 245 is a set of memory locations (i.e. in the buffers) arranged in some order by metadata describing the queue 245. The memory locations may (and often are) non-contiguous relative to their addressing scheme and/or physical arrangement. For example, the metadata for one queue 245 may indicate that the queue 245 is comprised of, in order, entry addresses 2, 50, 3, and 82 in a certain buffer.

In many embodiments, the sequence in which the queue 245 arranges its constituent data units 205 generally corresponds to the order in which the data units 205 or data unit portions in the queue 245 will be released and processed. Such queues 245 are known as first-in-first-out ("FIFO") queues, though in other embodiments other types of queues may be utilized. In some embodiments, the number of data units 205 or data unit portions assigned to a given queue 245 at a given time may be limited, either globally or on a per-queue basis, and this limit may change over time.

2.8. Traffic Management

According to an embodiment, a device 200 further includes one or more traffic managers 240 configured to control the flow of data units 205 to one or more packet processor(s) 250. A traffic manager 240 may receive data units 205 directly from a port 210, from an ingress processor 250, and/or other suitable components of device 200. In an embodiment, the traffic manager 240 receives one TDU from each possible source (e.g. each port 210) each clock cycle or other time slot.

Traffic manager 240 may include or be coupled to buffers 244 for buffering data units 205 prior to sending those data units 205 to their respective processor(s) 250. A buffer manager within the traffic manager 240 may temporarily store data units 205 in buffers 244 as they await processing by processor(s) 250. A data unit 205 or data unit portion in an buffer 244 may eventually be "released" to one or more processor(s) 250 for processing, by reading the data unit 205 from the buffer 244 and sending the data unit 205 to the processor(s) 250. In an embodiment, traffic manager 240 may release up to a certain number of data units 205 from buffers 244 to processors 250 each clock cycle or other defined time slot.

Beyond managing the use of buffers 244 to store data units 205 (or copies thereof), a traffic manager 240 may include queue management logic configured to assign data units 205 to queues 245 and manage the flow of data units 205 through the queues 245. The traffic manager 240 may, for instance, "enqueue" a PDU that has been fully buffered by identifying a specific queue 245 to assign the PDU to, and then linking a PDU identifier or other PDU metadata to the assigned queue. The traffic manager 240 may further determine when to release—also referred to as "dequeuing"—data units 205 from queues 245 by sending instructions to the buffer manager 244 read/release the data units 205 and then providing the data read from the buffer 244 to specific packet processor(s) 250.

In an embodiment, different queues 245 may exist for different sources or destinations. For example, each port 210 and/or port 290 may have its own set of queues 245. The queue 245 to which an incoming data unit 205 is assigned and linked may, for instance, be selected based on forwarding information indicating which port 290 the data unit 205 should depart from. In an embodiment, a different egress processor 250 may be associated with each different set of one or more queues 245. In an embodiment, the current processing context of the data unit 205 may be used to select which queue 245 a data unit 205 should be assigned to.

In an embodiment, there may also or instead be different queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

Though only one packet processor 250 and traffic manager 240 are depicted, a device 200 may comprise any number of packet processors 250 and traffic managers 240. For instance, different sets of ports 210 and/or ports 290 may have their own traffic manager 240 and packet processors 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 250 for any number of intermediate stages. The data unit 205 may thus pass through any number of traffic managers 240 and/or packet processors 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 250, such that data units 205 (or portions thereof) are assigned to buffers 244 only upon being initially processed by an ingress packet processor 250. Once in an egress buffer 244, a data unit 205 (or portion thereof) may be "released" to one or more egress packet processor(s) 250 for processing.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 5. As another example, a data unit 205 may be replicated a number of times after it reaches the head of a queue 245 (e.g. for different egress processors 250). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 244, or a single copy of the data unit 205 may be linked from a single buffer location to multiple queues 245 at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 250 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 250 performs edits as well.

The forwarding logic may be hard-coded and/or configurable, depending on the embodiment. For example, the forwarding logic of a device 200, or portions thereof, may, in some instances, be at least partially hard-coded into one or more ingress processors 250 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers 244 are overutilized, a queue 245 is over a certain size, and/or a data unit 205 has a certain characteristic.

2.10. Instantaneous Garbage Collection

As mentioned above, the free lists for a buffer space may include one or more pre-built linked lists, such as pre-built linked lists 460, from which an available TDU entry to store a new TDU may be selected. In an embodiment, some or all of these pre-built linked lists may be intra-packet linked lists (i.e. intra-packet linking data) that were built for PDUs that have been dropped or discarded, or are otherwise no longer needed, and have therefore been sent to a garbage collector. As discussed above, each node of an intra-packet linked list has a corresponding TDU entry. The contents of TDU entries that correspond to nodes of a discarded intra-packet linked list are, by definition, no longer needed. Hence, those TDU entries are free to store new data. One may therefore select a TDU entry in which to store a new TDU by selecting a node from a pre-built linked list. In a similar manner, some or all of these pre-built linked lists may be repurposed receive contexts that are no longer needed.

Conventionally, once a PDU has been dropped, auxiliary structures such as intra-packet linked lists and/or receive contexts are simply discarded without serving any further purposes. Moreover, conventional garbage collection of a dropped PDU that is buffered in the manner described herein can be a prolonged endeavor, as the garbage collector must traverse each of the intra-packet linked lists for the PDU to locate each entry that should be freed and returned to the bank free list(s). The complexity of this problem increases when multiple PDUs are dropped at the same time. By contrast, in embodiments, garbage collection of the PDU may be performed virtually instantaneously simply by adding each of the intra-packet linked lists for the PDU to a table of pre-built linked lists from which free TDU entries may be selected. Thus, discarded intra-packet linked lists are repurposed as a free list. In embodiments, multiple PDUs can be dropped at the same time and all of the intra-packet linked lists can be converted to a pre-built link list. Similarly, receive contexts of each PDUs can be reused for the same purpose.

More specifically, there may be one or more tables of available pre-built linked lists 460. These tables may be global, or bank-specific, depending on the embodiment. In an embodiment, there may further be different tables for different sources or other entities. The tables need only track the address of the head intra-packet entry for each pre-built linked list. However, any suitable additional information about each pre-built linked list may also be stored, such as the size of the pre-defined linked list, an associated source port or entity, and so forth. When a new TDU entry is needed to store an incoming TDU, the new TDU entry may be selected using the normal bank free list or one of the pre-built linked lists, depending on the context and on the buffer assignment logic.

Utilizing Pre-Existing Linking Data

In an embodiment, pre-built linked lists can readily be utilized, in whole or in part, as linking data for new PDUs. As TDU entries to store TDUs for a new PDU are selected from a common pre-built linked list, in the order or the pre-built linked list, the linking data that would be generated if building an intra-packet linked list for the new PDU from scratch turns out to be exactly the same as the existing linking data in the pre-built linked list. Hence, the linking data in the pre-built linked list can be used as linking data for the intra-packet linked list, without recreating the linking data. In other words, a discarded intra-packet linked list may be recycled or reclaimed as a linking data for another PDU, thereby avoiding unnecessary re-creation of some or all of the linking structures for the other PDU.

More specifically, normally, when storing a new TDU for a PDU within a newly assigned TDU entry, the TDU entry would need to be added to the intra-packet linking data for the PDU. This may require a number of memory operations, such as reading or locating the tail entry of the relevant intra-packet linked list for the PDU, and writing the address of the newly assigned TDU entry to the tail entry. By selecting a new TDU entry from a pre-built linked list, some or all of these memory operations may be repurposed to retrieve the TDU address. This provides instantaneous garbage collection without adding any new memory operation.

To realize such benefits, a pre-built linked list may only be utilized for assigning TDU entries to one PDU at a time, else the pre-built linked list may not be valid. Hence, in some embodiments, once a pre-built linked list has been used to assign a TDU entry to a PDU, it may be assigned exclusively to that PDU for any future TDU entry assignments, so long as the PDU is being actively received. Moreover, TDU entries should always be assigned from the beginning of a pre-built linked list, so as to preserve the ordering of the linking data.

In this manner, the PDU's first TDU to be stored in a bank would be assigned to the TDU entry corresponding to the first node in the pre-built linked list, the PDU's second TDU to be stored in the bank would be assigned to the TDU entry corresponding to the second node in the pre-built linked list, and so forth. As a result, the pre-built linked list becomes the intra-packet linking data for the PDU, without requiring additional memory operations to create the linking data.

In some embodiments, it may be possible to know the size of the intra-packet linked list needed for a PDU before-hand (e.g. based on foreknowledge of the PDU size and/or careful selection of the banks to which TDUs are to be written), and to thus assign a PDU to a pre-built linked list of exactly the necessary size. In most embodiments, however, it is likely that, at least some of the time, an intra-packet linked list for a new PDU will not be exactly the same size as the pre-built linked list assigned to the PDU. In such cases, if the pre-built linked list is exhausted before the PDU has been completely buffered, additional TDU entries may be selected from the bank free list, or another pre-built linked list may be assigned to the PDU and linked to the first pre-built linked list at the time of when last TDU address is used of the previous pre-built linked list.

If, on the other hand, the last TDU of the PDU has been received and the pre-built linked list is not yet exhausted, the unused portion of the pre-built linked list may be returned as a new pre-built linked list to the pre-built linked list table (e.g. with the address of the first unused node serving as the head address).

In multi-bank embodiments where TDUs for a PDU may be distributed amongst multiple banks and intra-packet linked lists link only TDUs in a single bank, there may be a separate pre-built linked list assigned to the PDU for some or all of the banks in which its TDUs are being stored.

In the event a PDU to which one or more pre-built linked lists have been assigned is dropped prior to its last TDU being received, the TDU entries remaining in these pre-built linked lists are easily reclaimed simply by designating the PDU's intra-packet linked list(s) as newly available pre-built linked list(s). This is because a pre-built linked list assigned to the PDU will already be linked to one of the PDU's intra-packet linked lists by virtue of the intra-packet linked list being built from the pre-built linked list. In an embodiment where the size of the pre-built linked list is tracked, note that the new pre-built linked list formed from the intra-packet linked list is the size of the intra-packet linked list plus the remaining length of the pre-built linked list assigned to the PDU.

There may at times be multiple pre-built linked lists available to assign to a PDU. In such cases, a pre-built linked list may be selected using any suitable logic, including based on the ages or lengths of the pre-built length lists, or even at random. In an embodiment, a source port or other entity may be associated with a pre-built linked list. For instance, the source of a PDU that is dropped, and from which the pre-built linked list was discarded, may be tracked with the pre-built linked list. When a pre-built linked list is selected for a new PDU, first preference may be given to pre-built linked lists associated with the source of the new PDU. In some embodiments, if no pre-built linked list from the new PDU's source is available, another pre-built linked list may then be selected using other prioritization mechanisms. In other embodiments, no pre-built linked list may be assigned the new PDU unless it is associated with the PDU's source.

In an embodiment, pre-built linked lists may additionally or instead be generated in response to non-garbage-collection-related events. For instance, pre-built linked lists may be created when the buffer space is initialized, as part of a background process, or in anticipation of needing linking data for a new PDU.

While recycling discarded linking data may be particularly advantageous in certain embodiments, note that in other embodiments advantages may be still be realized simply from repurposing the discarded linked lists as free lists that may be used for any PDUs, without reusing the actual linking structure as linking data for a new PDU.

Multiple Bank Free Lists

In an embodiment, there may be multiple bank free lists, each described by data in a table of bank free lists. Selecting an available TDU entry from a bank free list may first comprise selecting which bank free list to take the available TDU entry from. This may be done randomly, using a round robin approach, using the least (or most) filled bank free list, or based on some characteristic associated with the bank free list. For instance, each bank may have a separate bank free list for each possible source port or some other entity. The buffer assignment logic may prefer to assign a PDU a TDU entry from the bank free list that is associated with the same entity as the PDU, or may only assign a TDU entry from the bank free list that is associated with the same entity, depending on the embodiment.

Repurposing Discarded Linked Lists as Bank Free Lists

In an embodiment, the bank free list is replenished through the normal dequeuing of TDUs as they are released from the buffer space. That is to say that, when a TDU is released from the buffer space through a normal process (i.e. not dropped or otherwise discarded), its TDU entry address is placed in the bank free list. Nonetheless, according to an embodiment, the bank free list may run out of TDU entries to assign to PDUs, even if there are TDU entries still available in pre-built linked lists. This can be especially problematic when the pre-built linked lists are locked to specific PDUs, such that other PDUs are unable to utilize the available TDU entries.

In an embodiment, TDU entries that correspond to nodes in certain pre-built linked lists may be added back to the bank free list. This may occur as part of a background process in which pre-built linked lists are gradually traversed, popping each TDU entry from the pre-built linked list and adding it back to the bank free list. Such a background process may be running continually, or initiated in response to a bank free list decreasing below a threshold size.

In yet another embodiment, the buffer manager may be configured to reserve one or more pre-built linked lists as backup bank free lists. Alternatively, a pre-built linked list may become a bank free list, using techniques described in the next section.

Storing Bank Free Lists in the Intra-Packet Link Memory

In some embodiments, bank free lists may be stored directly within the intra-packet memory. A bank free list is maintained as a linked list within the corresponding intra-packet bank, in similar manner to the intra-packet linked lists. Pointers to the heads of each bank free list are maintained. Whenever a TDU entry is needed from a bank free list, the TDU entry is taken from the head of the bank free list, and the pointer for the bank free list is updated to point to the next entry in the bank free list.

If there are no more entries in the bank free list, then the pre-built linked list table is consulted to locate a pre-built linked list of a suitable size to serve as a new bank free list. The selected pre-built link list may, for example, further be selected at least partially at random, or on account of sharing a common characteristic with the bank free list, such as being associated with a same source or other entity. The pointer to the head of the bank free list is updated to point to the selected pre-built linked list. In an embodiment, instead of waiting for the bank free list to become empty, the logic may wait for the bank free list to shrink to a certain size. Once this size, or smaller, a pre-built linked list may be linked to the end of the bank free list.

In some embodiment, a table of bank free lists may be combined with a table of pre-built linked lists. The table may include some indication of whether a linked list is a bank free list or a pre-built linked list. Or, in an embodiment, bank free lists may be indistinguishable from pre-built linked lists, and used interchangeably. For instance, a bank free list may be assignable to a specific PDU, and its linking data reused for that PDU, just as a pre-built linked list may be utilized as a bank free list for selecting TDU entries for PDUs that are not assigned to pre-built linked lists. In such embodiments, the buffer space may more generally be characterized as storing pointers to linked lists in an intra-packet linking memory, which may be utilized as described above as bank free lists, assignable pre-built linked lists, or intra-packet linked lists, depending on the needs of the implementing device.

Bypassing the Bank Free List Using Multi-Ported Memory

In some embodiments, the intra-packet memory may be a multi-ported memory instead of a single-ported memory, thereby supporting at least two I/O operations in a given clock cycle. In an embodiment, such a configuration may further be leveraged to reduce I/O operations by bypassing garbage collection of dequeued TDU entries and instantly reusing the dequeued TDU entries for storing new TDUs for new PDUs.

Normally, when a first TDU is dequeued (e.g. for a first PDU), the address of a first TDU entry in which the first TDU was buffered would need to be read from an intra-packet link list and then written to a bank free list. Meanwhile, when a second TDU (e.g. for a new PDU that is being received) is placed in the buffer, the second TDU entry address must to be read from a bank free list and written to an intra-packet linked list. In an embodiment with at least a double-ported intra-packet link bank, however, if, in the same time slot, the second TDU is being placed in the buffer bank from which the first TDU is being dequeued, the first TDU entry address may bypass the bank free list and be written directly to the second intra-packet link list in the same clock cycle in which it was read from the first intra-packet link list. This, of course, reduces the number of memory operations needed on the intra-packet link memory for the combined dequeuing of the first TDU and enqueueing of the second TDU.

2.11. Miscellaneous

Device 200 and buffer space 400 illustrate only several of many possible arrangements of components configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in a device 200 that utilizes some or all of the buffering mechanisms described with respect to FIG. 4. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Enqueue Process

Figure 5:
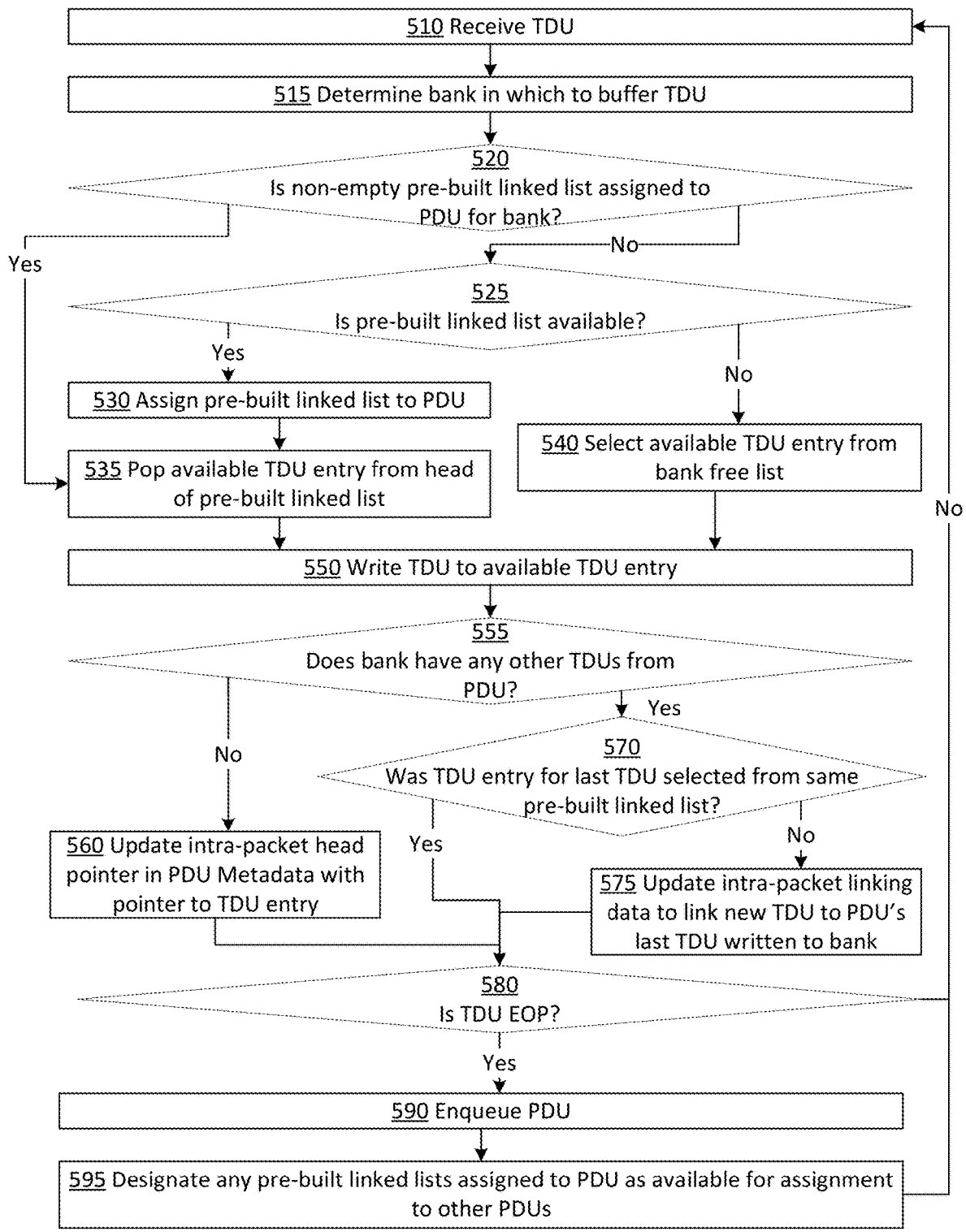
FIG. 5 illustrates an example process flow for enqueuing a TDU at a buffering component.

FIG. 5 illustrates an example process flow 500 for enqueuing a TDU at a buffering component, according to an embodiment. Flow 500 may be performed, for instance, by various components of a network device, such as by a buffer manager and/or other logic within a traffic manager.

Block 510 comprises receiving a TDU, such as a TDU 320. The TDU may be received at a traffic manager such as traffic manager 240, or at any other device component that may need to temporarily buffer the TDU.

Block 515 comprises determining a TDU buffer bank in which to buffer the TDU, such as a TDU buffer bank 445. Any assignment mechanism may be utilized to determine the bank, such as a round-robin mechanism, random or pseudo-random mechanism, probabilistic mechanism, a fill-level-based mechanism, and so forth. In some embodiments it may be preferable that the assignment mechanism load-balance amongst the TDU buffer banks.

In an embodiment, the assignment mechanism may be configured not to select a logical bank that is currently being read from, or to which another TDU has already been written in a current clock cycle. In another embodiment, a logical bank may support multiple operations per clock cycle and the assignment mechanism may therefore be configured not to select a logical bank when there are no more available I/O operations in the current clock cycle. In some embodiments, a TDU must not be buffered in the same bank as the PDU's immediately preceding TDU, though in other embodiments no such restriction need be imposed. In some embodiments, banks may be selected based on some attribute or characteristic of the TDU or PDU, such as a source, flow identifier, or other characteristic. In embodiments with only one TDU buffer bank, block 515 is of course not necessary.

Block 520 comprises determining whether there is a pre-built linked list that is currently assigned to the PDU for the selected bank. This may comprise, for instance, searching for a pre-built linked list, in a pre-built linked list table, that is marked as currently associated with the PDU. Or, this may comprise reading a pointer in PDU metadata, such as in a receive context or other suitable memory structure, that indicates the head addresses of the currently assigned pre-built linked lists for the PDU. If no address is found, then either no list has been previously assigned, or the previously assigned list is empty.

For the first TDU of the PDU, the PDU metadata may not exist, and thus need to be created, which of course means that there would be no currently assigned pre-built linked list. Likewise, for embodiments with bank-specific pre-built linked lists, no currently assigned pre-built linked list would exist for the first TDU of the PDU to be buffered in the bank. Moreover, if a pre-built linked list had previously been assigned to the PDU for the bank, but the length of that linked list is now zero, the pre-built linked list previously assigned to the PDU is now empty, and thus no valid pre-built linked list is considered to be assigned to the PDU.

If a pre-built linked list is currently assigned to the PDU for the bank, then flow 500 proceeds to block 535. Otherwise, flow 500 proceeds to block 525, which comprises determining if a pre-built linked list is available for the bank. Block 525 may comprise, for instance, consulting a table of pre-built linked lists that are currently available. If a pre-built linked list is available, flow 500 proceeds to block 530. Otherwise flow 500 proceeds to block 540.

In an embodiment, block 525 is not necessarily performed for each TDU, but may only be performed for the first TDU of each PDU in the bank, or only for some subset of TDUs. In other cases, flow 500 would bypass block 525 and proceed to block 540.

Block 530 comprises assigning a pre-built linked list to the PDU for the bank. Any assignment mechanism may be utilized. In an embodiment, if pre-built linked lists are associated with source ports or other entities, the assigned pre-built linked list may be selected from the subset of available linked lists that are associated with the relevant entity. If there are no pre-built linked lists that qualify, then, depending on the embodiment, either a pre-built linked list may be selected from the set of all pre-built linked lists at large, or flow 500 may proceed to block 540.

The assigning may further comprise writing metadata that indicates that the selected pre-built linked list is assigned to the PDU, and therefore not available to other PDUs. Depending on the embodiment, this may comprise making an indication of the PDU to which the pre-built linked list belongs in the pre-built linked list table, or this may comprise writing a pointer to the head address of the pre-built linked list to the PDU metadata. In the latter case, the pre-built linked list may be deleted from or otherwise marked as unavailable in the pre-built linked list table. Moreover, a length of the pre-built linked list may be copied to the PDU metadata to track the size of the pre-built linked list.

Block 535 comprises selecting a TDU entry to write the TDU to by "popping" the first node from the head of the pre-built linked list. More specifically, the TDU entry that is selected is the TDU entry whose address corresponds to the intra-packet entry at the head of the pre-built linked list. The intra-packet entry is then read to determine the address of the next intra-packet entry in the linked list. The pointer to the head of the pre-built linked list is updated to point to the address of the next intra-packet entry, or is set to a null pointer if no such address is found. If there is a counter that indicates the current length of the pre-built linked list, the counter is decremented. From flow 535, flow 500 proceeds to block 550.

Returning to block 540, in the event that no pre-built linked list available, then block 540 comprises selecting an available TDU entry from a bank free list. If there are multiple bank free lists, this may comprise first determining which bank free list to select the available TDU entry from. Again, any assignment mechanism may be utilized, such as based on the size of the bank free list, based on a source associated with the bank free list, based on a random or round robin algorithm, etc.

In some embodiments, the selected TDU entry may simply be the first TDU entry in the list. For instance, if the bank free list is maintained as a linked list, the first node of the linked list may be popped from the head of the list. In other embodiments, any node may be selected. The address of the selected TDU entry is removed from the bank free list, so that it cannot be selected for another TDU.

In the event that no TDU entry is available, either at all, or, depending on the embodiment, in the selected bank free list, flow 500 may branch to dropping the PDU (not depicted).

From block 540, flow 500 also advances to block 550, which comprises writing the TDU to the TDU entry that was selected in block 535 or 540. Optionally, a counter of the size of the PDU and/or the number of TDUs written for the PDU in the selected bank may be incremented.

Block 555 then comprises determining whether the bank to which the TDU was written is buffering any other TDUs from the same PDU. This may be determined from PDU metadata that indicates the intra-packet head pointer for the bank. If no intra-packet head pointer is found, then flow 500 proceeds to block 560, which comprises updating the intra-packet head pointer for the bank to point to the TDU address and/or to the intra-packet entry that corresponds to the selected TDU entry. From block 560, flow 500 proceeds to block 580.

On the other hand, if an intra-packet head pointer is found in block 555, flow 500 proceeds to block 570, which comprises determining whether the TDU entry for the last TDU to be written to the bank for the PDU, other than the TDU written in block 550, was selected from the same pre-built linked list as the currently selected TDU entry. Generally, this will be true only if there already was a non-empty pre-built linked list assigned to the PDU for the bank in block 520. Put another way, this is true if the TDU entry to which the current TDU was written was neither selected from a newly assigned pre-built linked list nor a bank free list. In any event, if the TDU entry for the PDU's last TDU to be written to the bank was selected from the same pre-built linked list, flow 500 skips to block 580, since the necessary linking data for the TDU entry already exists from the pre-built linked list and need not be written. Otherwise, flow 500 proceeds to block 575 to write the necessary linking data.

Block 575 comprises updating the intra-packet linking data to link the TDU entry to which the new TDU was written, per block 550 (also referred to as the "new TDU entry"), to the TDU entry of the last TDU to have been written to the bank for the PDU (also referred to as the "previous TDU entry"). This may comprise, for instance, writing the address of the intra-packet entry that corresponds to the new TDU entry to the intra-packet entry at the tail address of the PDU's intra-packet linked list (i.e. the intra-packet entry that corresponds to the previous TDU entry). From block 575, flow 500 proceeds to block 580.

Block 580 comprises determining whether the TDU is the last TDU in the PDU (i.e. the EOP). If so, flow 500 proceeds to block 590. If not, flow 500 returns to block 510 for reception of additional TDUs.

In an embodiment, before returning to block 510, flow 500 may optionally include a step of determining whether the pre-built linked list assigned to the PDU has been exhausted. If so, then flow 500 may further include assigning a new pre-built linked list to the PDU and updating the intra-packet linking data to link the new pre-built linked list to the newly written TDU. In essence, such an embodiment moves performance of blocks 530 and 575 up in advance of receiving the next TDU. Moreover, in an embodiment, these steps may be performed at any time before the next TDU arrives (e.g. in a background process, in response to block 535, etc.), and not simply after block 580. Furthermore, in an embodiment, these steps may be performed if it is determined that the pre-built linked list has reached some threshold size (e.g. only one node remaining) rather than waiting for the pre-built linked list to be exhausted.

Block 590 comprises enqueueing the PDU. Enqueueing the PDU may involve a number of steps depending on the embodiment. For instance, block 590 may include transferring some or all of the PDU metadata from a receive context to an inter-packet link memory. Block 590 may further comprise identifying a queue to assign the PDU to, and/or generating additional PDU metadata.

Block 595 comprises designating the remaining portions of any pre-built linked lists still assigned to the PDU as being once again available for assignment to other PDUs. For instance, the address of the first unused intra-packet entry in each of the assigned linked lists may be written back to a pre-built linked list table, along with the remaining length(s) of each of the pre-built linked lists.

In an embodiment, block 595 may further comprise erasing, in each bank to which a pre-built linked list was still assigned, any linking data in the intra-packet entry that corresponds to the PDU's last TDU entry in the bank. This effectively breaks the link between the PDU's intra-packet linked list in each bank and the unused portion of the corresponding pre-built linked list. In some embodiments, however, this action may be unnecessary if a counter of the length of the intra-packet linked list is kept, since the counter may be used to determine the end of the intra-packet linked list.

Flow 500 illustrates but one example flow for enqueueing a TDU in a system that employs the buffering techniques described herein. Other flows may include additional or fewer elements, in varying arrangements. For instance, in some embodiments, the linking data in pre-built linked lists need not necessarily be repurposed, and the pre-built linked lists are instead used simply as bank free lists. In such embodiments, block 570 may be skipped, such that flow 500 always branches through block 575 when there are previous TDUs from the PDU in the bank. Moreover, in some such embodiments, blocks 520-535 and 595 may be omitted, such that flow 500 always flows through block 540.

3.2. Repurposing Discarded Linked Lists as Free Lists

Figure 6:
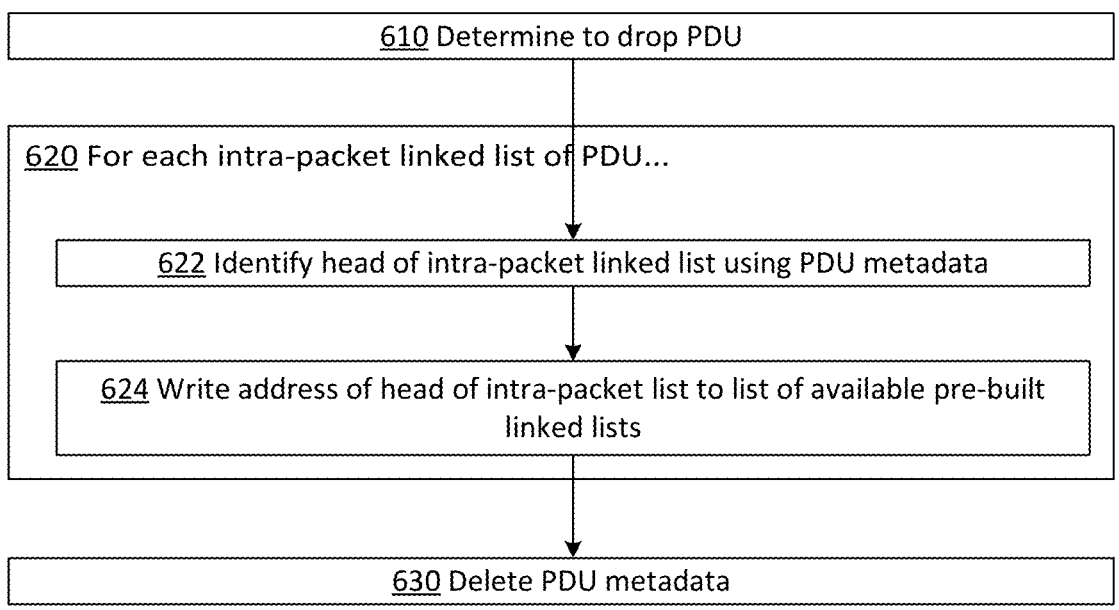
FIG. 6 illustrates an example process flow for repurposing discarded linked lists as free lists.

FIG. 6 illustrates an example process flow 600 for repurposing discarded linked lists as free lists, according to an embodiment. Flow 600 may be performed, for instance, by various components of a network device, such as by a garbage collector and/or other logic within a traffic manager. A network device may be configured to perform one or both of flows 500 and 600.

Block 610 comprises determining to drop a PDU that has been at least partially buffered (e.g. per flow 500 or other described buffering techniques). A PDU may be dropped in response to a variety of events, such as determining that there is no available space in which to buffer the rest of it (either physically, or on account of some restriction related to an attribute of the PDU), determining that the PDU cannot be enqueued (again on account of some restriction related to an attribute of the PDU), determining that a traffic flow to which the PDU belongs is experiencing an unacceptable delay, and so forth.

In an embodiment, flow 600 may be particularly adapted to responding to drops that occur before the PDU has been entirely buffered (e.g. before performance of block 590 in FIG. 5). However, in other embodiments, flow 600 may be performed in response to drops at other times, or even in response to other events that involve removing the PDU from the buffer.

Block 620 comprises a series of steps for each intra-packet linked list of the PDU. First, block 622 comprises identifying the head of the intra-packet linked list using the PDU metadata. Then, block 624 comprises writing the address of the head of the intra-packet linked list to a pre-built linked list table. As a result of block 624, the intra-packet linked list is now a pre-built linked list from which available TDU entries may be assigned using techniques described elsewhere herein.

Finally, in block 630, the PDU metadata may be deleted. The PDU is now considered to have been dropped, and garbage collection is considered to have been performed.

Flow 600 illustrates but one example flow for repurposing discarded linked lists. Other flows may include additional or fewer elements, in varying arrangements. In an embodiment, similar steps may be taken with respect to receive contexts of PDUs that have been dropped, or more generally receive contexts that are no longer needed.

3.3. Replenishing Bank Free Lists with Bank Free Lists

Figure 7:
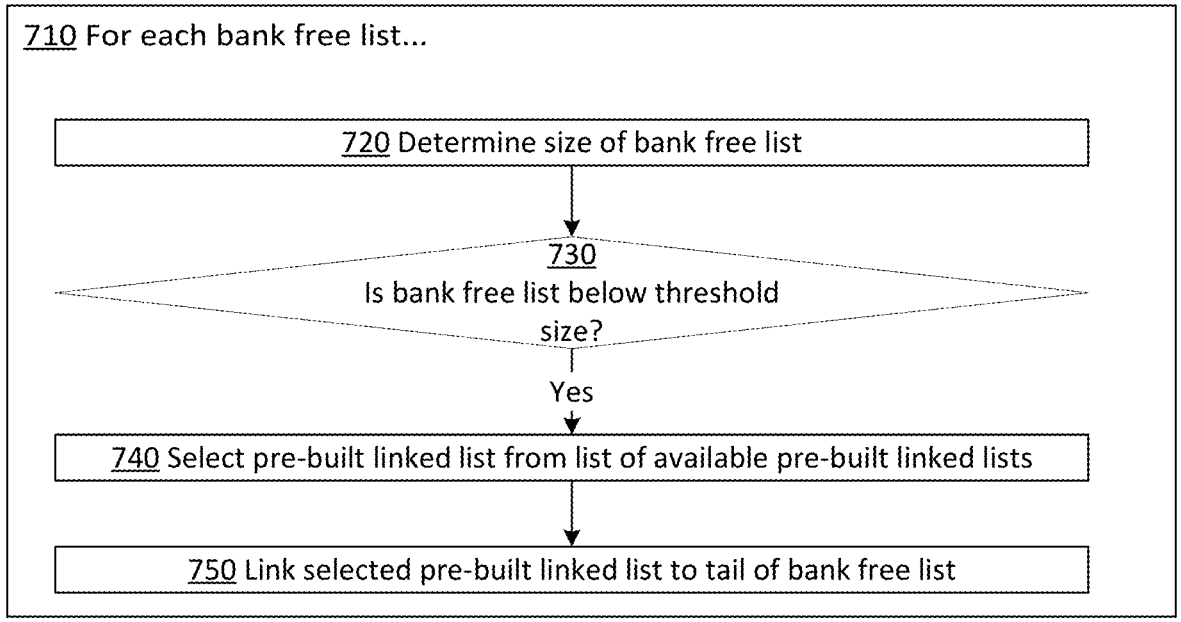
FIG. 7 illustrates an example process flow for replenishing bank free lists with pre-built linked lists.

FIG. 7 illustrates an example process flow 700 for replenishing bank free lists with pre-built linked lists, such as formed as a result of flow 600. Flow 700 may be performed in an embodiment where bank free lists are maintained in the intra-packet link memory along with the pre-built linked lists. A device may be configured to use pre-built linked lists for one or both of repurposing linking data, per flow 500, or replenishing bank free lists, per flow 700.

Block 710 comprises a series of steps that is performed for each bank free list associated with a bank over time. As mentioned above, there may be any number of bank free lists, including just one. Block 710 may be evaluated continuously by some background process over predefined intervals, or in response to triggering events (e.g. each time an address is assigned from the list). Block 710 includes subblocks 720-750.

Block 720 comprises determining the size of the bank free list. This may comprise reading a counter that indicates the size, traversing the linked list by which the bank free list is implemented, and/or any other steps.

Block 730 comprises determining whether the bank free list is below a threshold size. The threshold size may be zero, one, ten, or any other suitable size. If so, flow 700 proceeds to block 740, which comprises selecting a pre-built linked list from a pre-built linked list table. Any suitable assignment mechanism may be utilized, though in one embodiment, a pre-built linked list having a source associated with the bank free list must be selected.

Block 750 comprises linking the selected pre-built linked list to the tail of the bank free list. This may comprise, for instance, writing the address of the head intra-packet entry of the pre-built linked list to the intra-packet entry at the tail of the bank free list.

Flow 700 illustrates but one example flow for replenishing bank free lists. Other flows may include additional or fewer elements, in varying arrangements.

3.4. Bypassing the Bank Free List Using Double-Ported Memory

Figure 8:
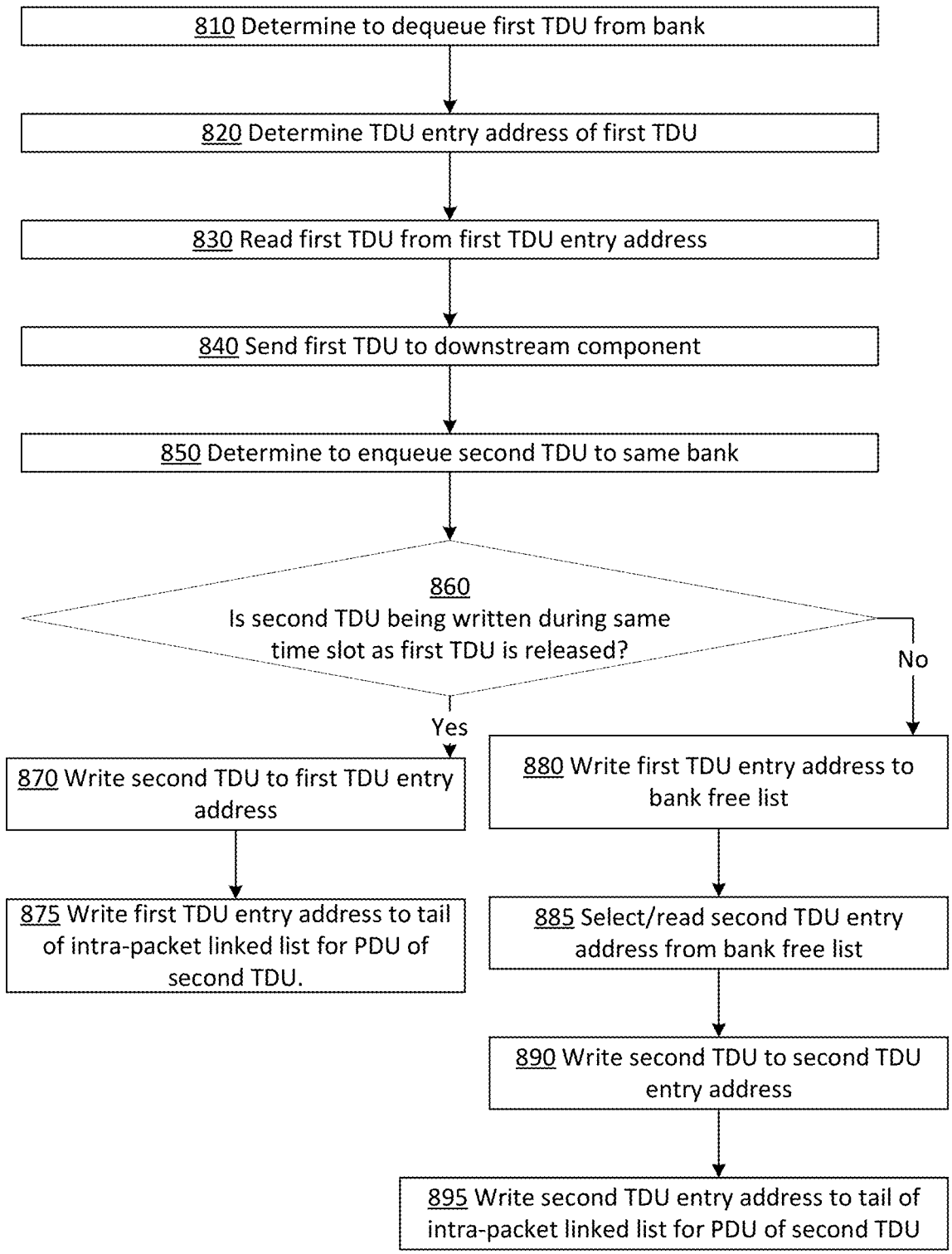
FIG. 8 illustrates an example flow for bypassing memory operations on a bank free list when concurrently dequeuing and enqueuing TDUs, using a double-ported intra-packet linking memory.

FIG. 8 illustrates an example flow 800 for bypassing memory operations on a bank free list when concurrently dequeuing and enqueuing TDUs, using a double-ported intra-packet linking memory, according to an embodiment. Flow 800 may, but need not necessarily, be performed in a device that implements some or all of flows 500-700.

Block 810 comprises determining to dequeue a first TDU from a TDU buffer bank. For instance, the first TDU may be the next TDU of a PDU that has reached the head of its queue, and has therefore been scheduled for release from the buffer to a packet processor. Block 820 comprises determining the TDU entry address of the first TDU. This may involve, for instance, reading the TDU entry address from the PDU metadata and/or inter-packet linking data. This may also or instead comprise reading an intra-packet entry address from the PDU metadata and/or inter-packet linking data, and determining the corresponding TDU entry address based thereon.

Block 830 comprises reading the first TDU from the first TDU entry address. Some scheduling of the operation may be required to avoid conflict with other operations. Block 840 comprises sending the first TDU to a downstream component, such as a packet processor.

Block 850 comprises determining to buffer a second TDU in the same bank. Block 860 comprises determining whether the second TDU is to be written during a same time slot as the first TDU is released. The time slot may be a specific set of one or more clock cycles. If the second TDU is to be written during a same time slot as the first TDU is released, then the write operation may be scheduled so as to allow the buffer manager to assign the TDU entry address of the first TDU to the second TDU, thereby bypassing the bank free list.

More specifically, flow 800 proceeds to block 870, which comprises writing the second TDU to the first TDU entry address. Then, block 875 comprises writing the first TDU entry address to the tail of the intra-packet linked list for the PDU of the second TDU.

On the other hand, if the second TDU is not to be written during the same time slot as the first TDU is released, then in block 880, the first TDU entry address is written to the bank free list. Block 885 then comprises reading and selecting a TDU entry address for the second TDU, from the bank free list. Block 890 comprises writing the second TDU to the second TDU entry address. Block 895 comprises writing the second TDU entry address to the tail of the intra-packet linked list for the PDU of the second TDU.

Flow 800 illustrates but one example flow for concurrently enqueuing and dequeuing TDUs. Other flows may include additional or fewer elements, in varying arrangements.

4.0. Implementation Example

FIGS. 9A-9I illustrate example contents of a simple buffer space as they change over time in response to example buffer assignment and garbage collection operations, according to an embodiment.

Figure 9A:
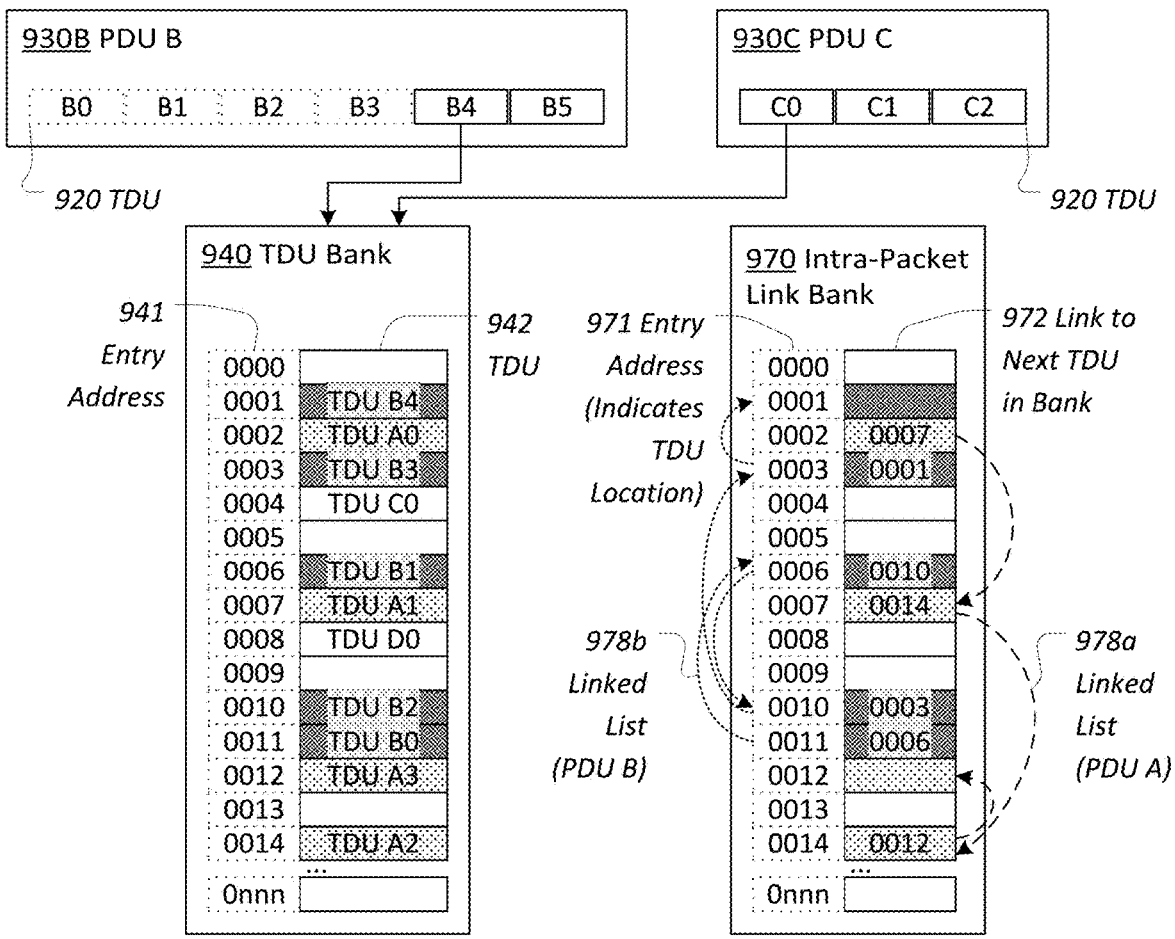

More particularly, FIG. 9A depicts example contents of a TDU buffer bank 940, intra-packet link bank 970, PDU metadata 980, and bank free list 950 at a time t0. The time t0 just after the buffer space has received and buffered a TDU B4 from a PDU 930b ("PDU B") and a TDU C0 from a PDU 930c ("PDU C"). The depicted components are examples of components found in buffer space 400 of FIG. 4: TDU buffer bank 940 is an example of an TDU buffer bank 445; intra-packet link bank 970 is an example of intra-packet link bank 475; PDU metadata 980 is an example of PDU metadata 480; and bank free list 950 is an example of bank free lists 455. Of course, buffer space 400 may take other forms, and also be practiced without specific details of FIG. 9A.

For simplification, the depicted example utilizes only a single TDU buffer bank to buffer a PDU. However, the illustrated techniques are easily extendable to embodiments where different portions of a PDU may be buffered in different banks, either by having separate intra-packet linked lists for the PDU in each bank in which a portion of the PDU is stored, or by allowing intra-packet entries to reference addresses in other intra-packet banks so as to create a single intra-packet list for a PDU across multiple intra-packet banks.

The depicted PDUs 930, including PDU 930b and 930c, are shown for illustrative purposes only. There is not necessary any structure within the implementing device that stores the PDUs 930 in the manner depicted, but rather the depiction shows how the PDUs 930 may have been stored prior to being sent to the implementing device. The various TDUs 920 of each depicted PDU 930 may be in states of transit across various components within and/or outside of the implementing network device. The TDUs 920 in dashes are already buffered in the TDU buffer bank 940, while the first non-dashed TDU 920 of each PDU has just been added to the TDU buffer bank 940, and the remaining TDUs 920 have yet to be received at the buffering component (though they may, at t0, nonetheless be found in various other components of the network device, such as an ingress arbiter, cache, packet processors, etc.).

TDU buffer bank 940 includes a number of addressable TDU entries. Each TDU entry has an entry address 941 by which it is referenced, and at least stores TDU data 942, though the entries may store additional non-depicted data as well. Although only sixteen entries are depicted, there may in fact be any number of TDU entries.

TDU buffer bank 940 may in some embodiments be a logical database comprising a number of physical banks in which SDUs of the TDUs are buffered individually. Hence, in such embodiments, the depicted view of TDU bank 940 is a simplified view of the TDU bank. In some embodiments, TDU data 942 may include or simply be a list or other mapping that indicates physical locations of the SDUs that belong to the TDU.

The TDUs 920 of PDUs 930 are each stored in a different, distinct, and non-contiguous entry within the TDU bank. For instance, TDUs A0-A3 of a PDU A are found at addresses 0002, 0007, 0014, and 0012, respectively. For illustrative purposes, FIGS. 9A-9I utilize different shading to depict contents of different PDUs and/or linked lists discussed with respect to the figure (e.g. in the case of FIG. 9A, different shading is used for PDU A and PDU B).

Intra-packet link bank 970 includes a number of addressable intra-packet entries. Each intra-packet entry has an entry address 971 by which it is referenced, and at least stores link data 972, though the intra-packet entries may store additional non-depicted data as well. Although only sixteen entries are depicted, there may in fact be any number of intra-packet entries.

Each intra-packet entry corresponds to a TDU entry that has the same relative address, and may further be said to correspond to the TDU stored therein. An intra-packet entry stores linking data for the TDU to which it corresponds. That is, for instance, the TDU entry storing TDU A0 at address 0002 of TDU bank 940 has linking data stored in the intra-packet entry at the corresponding address 0002 of intra-packet bank 970. Note that, although the corresponding addresses in the depicted example are in fact the same, in other embodiments addresses may be corresponding if they are readily derivable from each other. For instance, TDU entry addresses 941 may be offset some consistent amount from their corresponding intra-packet entry addresses 971, or may be some other function of their corresponding intra-packet entry addresses 971.

After a first TDU has been written to the TDU bank 940, the next time a TDU (a "second TDU") belonging to the same PDU is written to the TDU bank 940, the linking data 972 in an intra-packet entry that corresponds to a first TDU may be updated to point to the second TDU. For instance, the linking data 972 for TDU A0 at the intra-packet entry address 0002 points to the intra-packet entry address 0007, which corresponds to TDU A1, because TDU A1 was the next TDU of PDU A to be stored in TDU bank 940 after TDU A0. Similarly, TDU B4 has just been written to the TDU entry at address 0001 of TDU bank 940. TDU B3 was previously the most recent TDU of PDU B to have been stored in TDU bank 940. TDU B4's intra-packet entry address has therefore been written to the intra-packet entry that corresponds to TDU B3 (i.e. at intra-packet entry address 0003).

Because the intra-packet entries point to other intra-packet entries, the intra-packet entries form chains, or linked lists 972, that link together the TDUs belonging to a PDU. For instance, linked list 978a is formed by following the linking data at address 0002 to address 0007 to address 0014 and finally to address 0012, thereby linking the corresponding TDUs A0-A3 of PDU A. Similarly, linked list 978b links together the TDUs B0-B4 of PDU B.

Note that the last intra-packet entry address in each linked list 978 does not store any linking data 972, because it is the "tail" of the linked list 978, meaning that it corresponds to the last TDU of a PDU to have been stored in TDU bank 940. In other embodiments, there may be linking data in the last entry of a linked list 978, but a counter of the size of the linked list 978 may indicate that the entry is the last entry in the linked list 978, and as such the linking data is invalid and should be ignored.

In another embodiment, the TDU data 942 may be maintained directly in the intra-packet link bank 970. That is to say, TDU bank 940 may be combined with intra-packet link bank 970. In another embodiment, the corresponding TDU entry address 941 for an intra-packet entry may written directly within the intra-packet entry.

The PDU metadata 980 includes various metadata for each PDU, including a PDU identifier 982, a head pointer 984, an assigned pre-built linked list identifier 986, a pre-built linked list length 987, a TDU count 988, and an EOP indicator 989 of whether the EOP for the PDU has been received. The PDU metadata 980 may of course include a variety of other undepicted metadata 980. Moreover, some of the depicted metadata need not necessarily be stored, such as indicator 989, but is depicted merely to assist in explaining the example operations depicted in the following figures.

While PDU metadata 980 is depicted as a single table for explanatory purposes, the PDU metadata 980 may actually be stored in two or more different locations. For instance, PDUs that are still in the process of being received (i.e. whose indicator 989 is negative), may be stored in separate receive contexts, as described in other sections. Metadata for other PDUs may be stored in an inter-packet link memory, and may omit fields such as field 986 and 987 that are only needed during reception of the PDU. Moreover, the assigned pre-built list identifier 986 may be replaced by information in the table of pre-built linked lists that indicates the PDU to which a pre-built linked list is assigned.

The head pointer 984 points to the address of the TDU entry that stores the first TDU of the PDU in TDU bank 940 (and/or to the corresponding intra-packet entry address). For instance, head pointer 984 for PDU A points to address 0002. In some embodiments where PDUs span multiple TDU banks 940, there may be a separate head pointer 984 for each TDU bank 940.

The TDU count 988 indicates the number of TDUs stored for the PDU. For example, there are four TDUs currently stored for PDU A, five TDUs currently stored for PDU B, and so forth.

Bank free list 950 stores a list of addresses 941 of TDU entries in TDU bank 940 that are currently available for storing new TDUs. The bank free list 950 may take a variety of forms described herein. As with any reference to a TDU entry address 941, in some embodiments where TDU entry addresses 941 are not the same as intra-packet entry addresses 971, the bank free list 950 may indicate available TDU entry addresses 941 by listing the corresponding intra-packet entry addresses 971 instead.

Figure 9B:
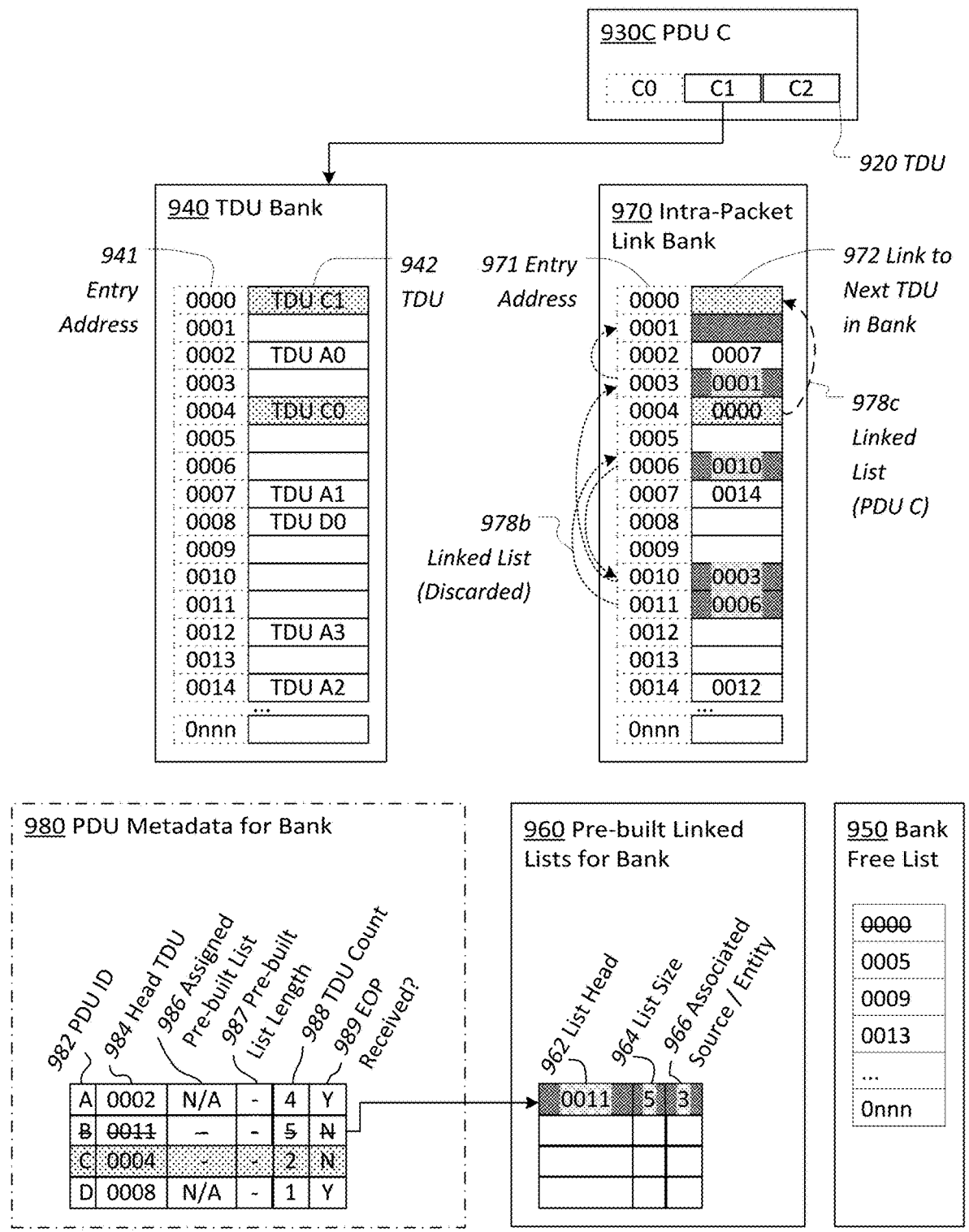

FIG. 9B depicts example contents of the foregoing components at a time t1 just after PDU B has been dropped (without its EOP having been received) and a TDU C1 has been received for a PDU C. Time t1, as well as subsequently depicted times t2-t8, may be any moment in time after the immediately preceding depicted time (i.e. t0 in the case of t1), and need not correspond to the lapsing of any specific number of time slots or clock cycles.

TDU C1 has been assigned the TDU entry address 0000 from the head of the bank free list 950, and is presently stored therein. The address 0000 is removed from the bank free list, and the TDU count 988 for TDU C is incremented by one. New linking data 972 is written to the intra-packet entry address 971 that corresponds to TDU C0 (address 0004), which was previously the last TDU 920 to have been received for PDU C. This linking data forms a new linked list 978c that links the TDUs for PDU C.

Meanwhile, because PDU B has been dropped, the TDU entries in which TDUs B0-B4 had been stored are no longer considered to store valid TDU data, though they may in some embodiments still retain the same data until overwritten. Conventionally, the TDU entry addresses 941 for TDUs B0-B4 would need to be added back to the bank free list 950 so as to make the TDU entries available for storing other data. This process may require a number of clock cycles to traverse the discarded linked list 978b so as to identify all of the relevant TDU entry addresses.

However, in accordance with the instantaneous garbage collection techniques described herein, the linked list 978b is instead repurposed as a pre-built linked list. The repurposing involves adding an entry for the linked list 978 to a pre-built linked list table 960 for TDU bank 940. For each pre-built linked list, the pre-built linked list table 960 stores a list head pointer 962, list size 964, and optionally additional metadata such as an associated source or entity 966 (for purposes described in other sections). Garbage collection for PDU B thus simply entails copying the head pointer 984 of PDU B as the list head 962 for the new pre-built linked list entry in table 960, copying the TDU count 988 of PDU B as the list size 964 for the pre-built linked list entry, copying any other PDU metadata 980 such as the associated source if needed, and then deleting the entry for PDU B in the PDU metadata 980.

FIG. 9C depicts example contents of the foregoing components at a time t2, just after a first TDU E0 has been buffered for a PDU E, and TDU C has been dropped. Since there was a pre-built linked list 978b available when TDU E0 was received, pre-built linked list 978b has been assigned to PDU E. The address formerly at the head of the pre-built linked list 978b (0011) has been assigned TDU E0, and TDU E0 has thus been stored at address 0011 in TDU Bank 940. Meanwhile, in the PDU metadata 980, the head pointer 984 for PDU E has also been set to address 0011, and the TDU count 988 has been set to 1. Note that the intra-packet entry at address 0011 remains unchanged, as its linking data 972 will be preserved for re-use by PDU E.

Address 0011 is now no longer considered to be part of the pre-built linked list 978b, but instead forms the beginning of the intra-packet linked list for PDU E. To track the assignment of linked list 978b to PDU E, the new head address of pre-built linked list 978b (0006) has been written to the assigned pre-built linked list identifier 986, and the associated pre-built list length 987 has been copied from the former list size 964 of the pre-built linked list, and decremented by one for the assignment of address 0011 to TDU E1. The pre-built linked list 978b is removed from the pre-built linked list table 960 so that it cannot be used for other PDUs.

Meanwhile, since PDU C has been dropped, its discarded linked list 978c has been placed in the pre-built linked list table 960, similar to the manner in which linked list 978b was added to table 960 previously.

Finally, a PDU D has been dequeued. Its TDU entry address (0008) has been added back to the end of the bank free list 950.

FIG. 9D depicts example contents of the foregoing components at a time t3, just after a TDU E1 has been buffered for a PDU E, and a TDU F0 has been buffered for a PDU F. TDU E1 has been assigned the next address in the pre-built linked list 978b, which is address 0006. Because the linking data 972 at intra-packet entry address 0011 was not changed previously, it already points to the address 0006, and thus no change is needed for TDU E1 in the intra-packet bank 970. The head pointer 986 for the assigned pre-built linked list 978b is updated to the next address in the list 978b. The length 987 of the pre-built linked list 978b is decremented by one, and the TDU count 988 for PDU E is incremented by one.

Pre-built linked list 978c has been assigned to PDU F and thus removed from the pre-built linked list table 960. Its first address (0004) has been assigned to TDU F0, which is stored at this address in the TDU bank 940. PDU metadata 980 has been updated with appropriate metadata for PDU F, similar to the manner in which PDU metadata 980 was updated for PDU E at t2.

FIG. 9E depicts example contents of the foregoing components at a time t4, just after a TDU E2 has been buffered. TDU E2 has been assigned the next address in former pre-built linked list 978b, which was address 0010. Because the linking data 972 at intra-packet entry address 0006 was not changed previously, it already points to the address 0010, and thus no change is needed for TDU E2 in the intra-packet bank 970. The TDU count 988 for PDU E is incremented by one.

TDU E2 is the last TDU in PDU E. Accordingly, the EOP indicator 989 has been marked as true, and the remainder of former pre-built linked list 978b has been returned to the pre-built linked list table 960 as a new linked list 978e of two nodes in length. Optionally, the link data 972 at the address 0010 may be emptied to indicate the end of the intra-packet linked list for PDU E, though this may be skipped because the TDU count 988 may also indicate that address 0010 is the end of the intra-packet linked list.

FIG. 9F depicts example contents of the foregoing components at a time t5, just after a TDU F1 has been buffered. TDU F1 has been assigned the next address in the pre-built linked list 978c, which is address 0000. Because the linking data 972 at intra-packet entry address 0004 was not changed previously, it already points to the address 0000, and thus no change is needed for TDU F1 in the intra-packet bank 970. The TDU count 988 for PDU F is incremented by one.

Normally, the head pointer 986 for the assigned pre-built linked list 978b would be updated to the next address in the list 978c. However, no such address exists, as pre-built linked list 978c is now entirely utilized as the intra-packet linked list for PDU F. Accordingly, a new pre-built linked list has been assigned to PDU F, the pre-built linked list 978e. Although the new assignment is depicted as taking place immediately after the previous pre-built linked list was exhausted, in other embodiments, the assignment may take place later, and even wait until a new TDU is received for PDU F. In yet other embodiments, the new pre-built linked list may have been linked to the tail pre-built linked list 978c before the linked list 978c was exhausted, as a result of a background process utilizing spare processing bandwidth or some other triggering event.

Figure 9G:
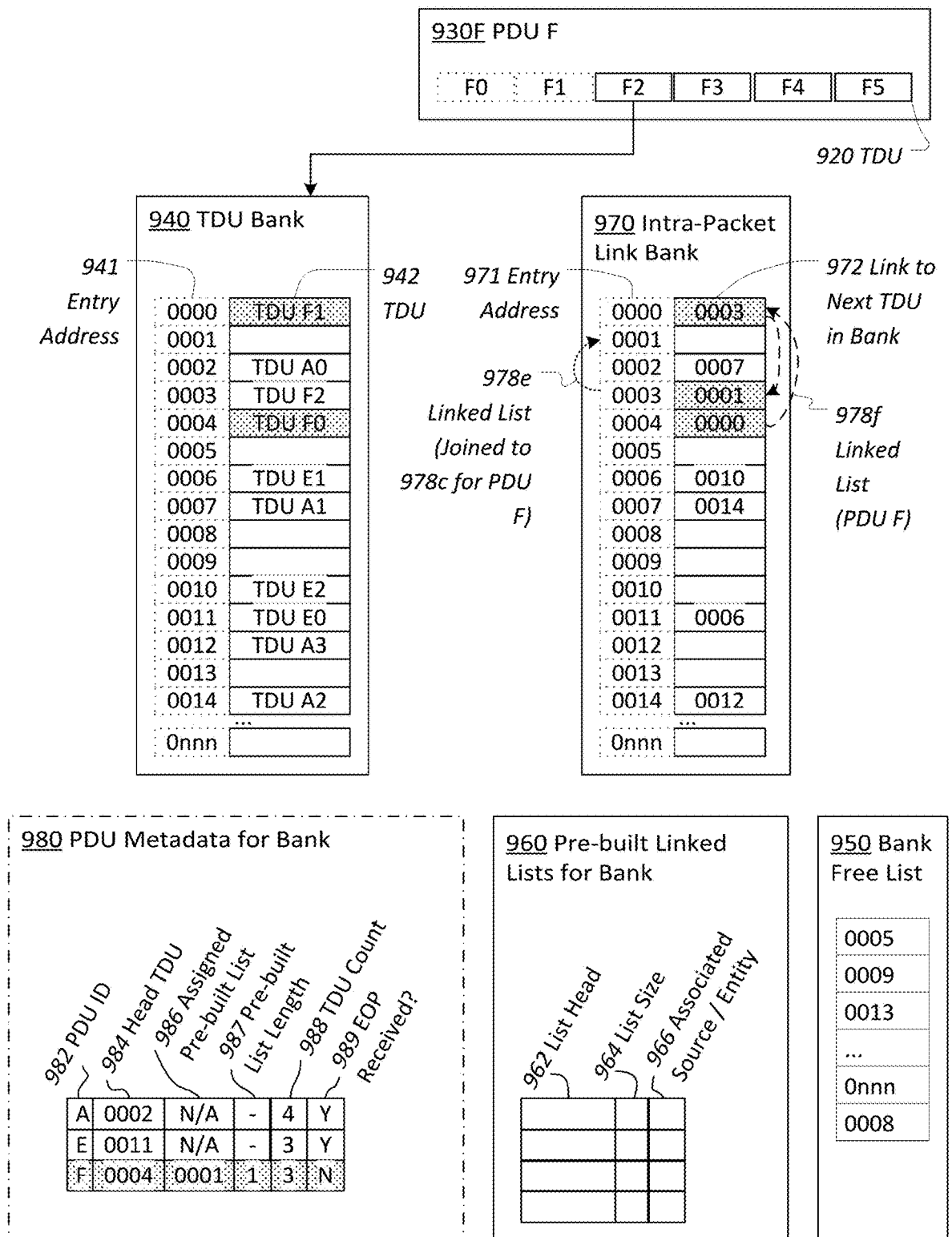

FIG. 9G depicts example contents of the foregoing components at a time t6, just after a TDU F2 has been buffered. TDU F2 has been assigned the head address in the pre-built linked list 978e, which is address 0003. Because the linking data 972 at intra-packet entry address 0000 was not previously linked to linked list 978e, the address of TDU F2 must be written to the tail of the intra-packet linked list for PDU F (i.e. at intra-packet entry address 0000) so as to link TDU F2 to TDU F1. The TDU count 988 for PDU F is incremented by one, and the length 987 of pre-built linked list 978e is decremented by one. In some embodiment, a new pre-built list is attached at the time the last address of the previous pre-built list is used.

Figure 9H:
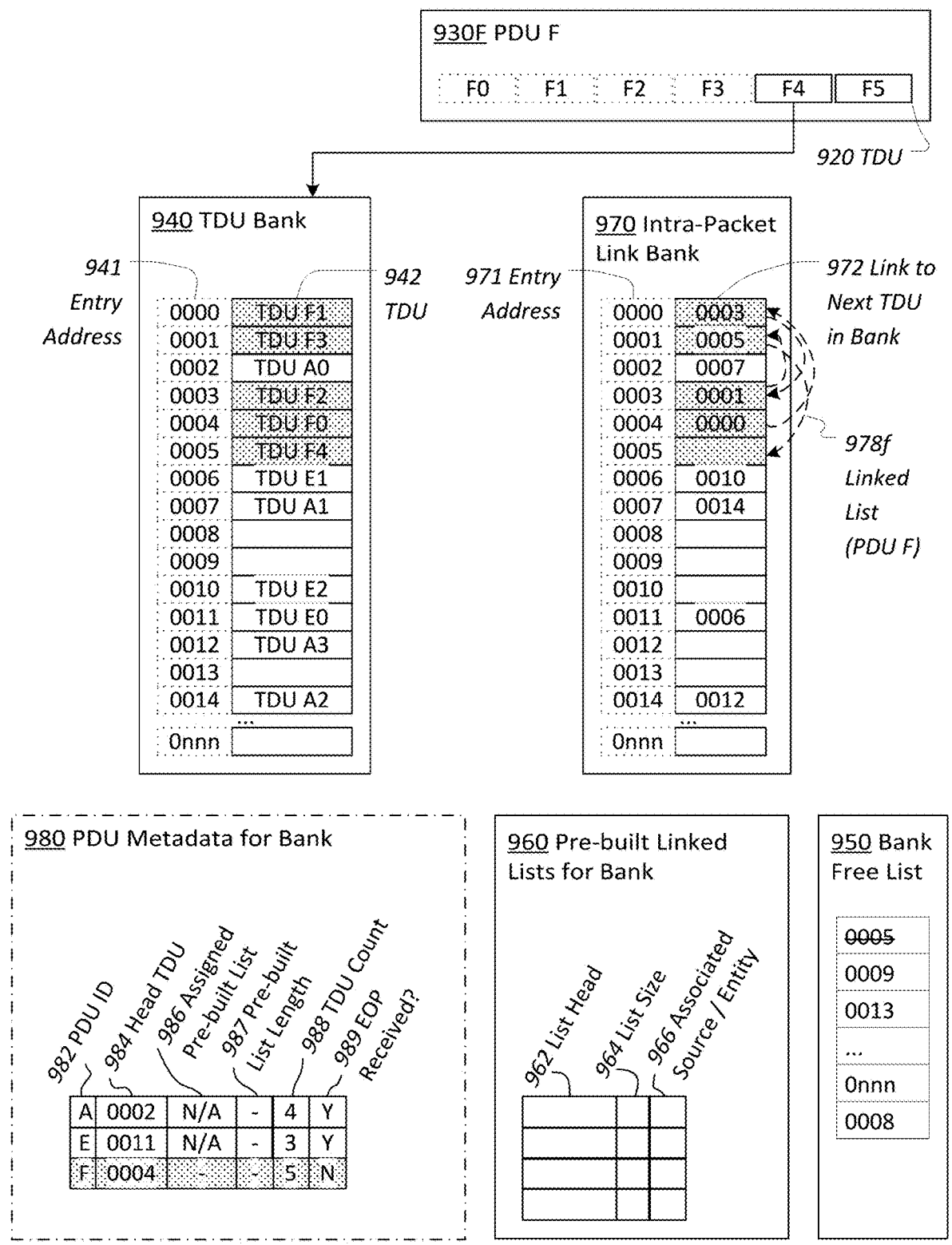

FIG. 9H depicts example contents of the foregoing components at a time t7, just after a TDU F3 and TDU F4 have been buffered for a PDU F. TDU F3 was assigned the next and last address in the former pre-built linked list 978e, which was address 0001. Because the linking data 972 at intra-packet entry address 0003 was not changed previously, it already pointed to the address 0001, and thus no change was needed for TDU F3 in the intra-packet bank 970.

By the time TDU F4 was received, however, pre-built linked list 978e was exhausted, with all of its nodes now utilized in the intra-packet linked list for PDU F. Pre-built linked list table 960 does not indicate any other available linked lists. Hence, TDU F4 is assigned a TDU entry from the head of the bank free list 950 (0005), and stored therein. The intra-packet entry at address 0001, corresponding to TDU F3, is updated to point to 0005, thereby linking TDU F4 to TDU F3. The TDU count 988 for PDU E has been incremented by two for TDU F3 and TDU F4.

Figure 9I:
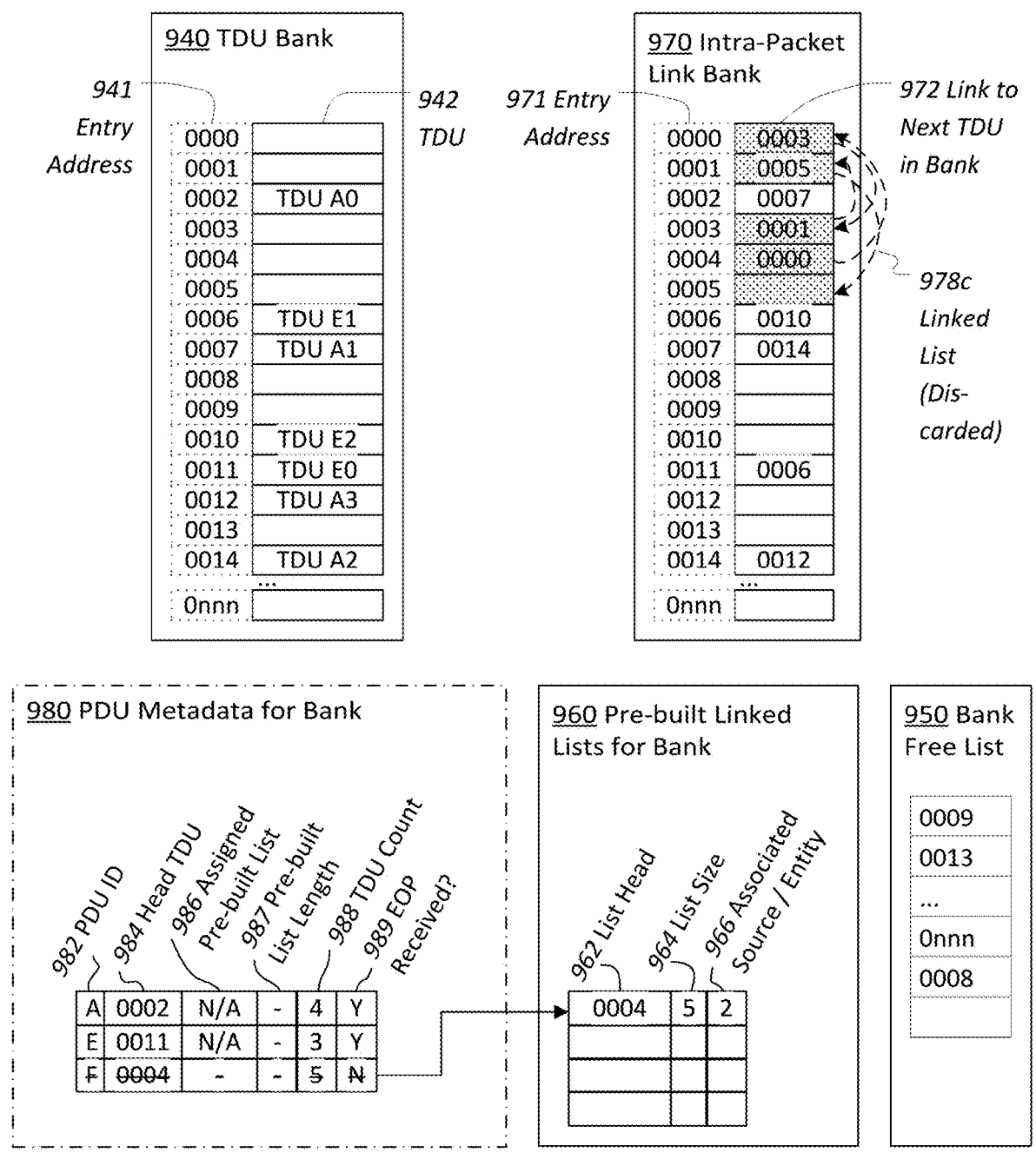

FIG. 9I depicts example contents of the foregoing components at a time t8, just after PDU F has been dropped. As with PDUs B and C before, the intra-packet linked list 978f for PDU F is now discarded and placed in the pre-built linked list table 960, for use in buffering future PDUs.

FIGS. 9A-9I depict but one example of the operations of a buffer in accordance with the described techniques. Other embodiments may include other data components or omit depicted data components. Moreover, in some embodiments, linking data 972 need not be reutilized for a PDU, but rather linked lists in the pre-built linked list table 960 may be transitioned to the bank free list 950. Also, in an embodiment, the bank free list may be stored as a linked list in the intra-packet bank 950.

5.0. Example Embodiments

Examples of some embodiments are represented, without limitation, in the following clauses:

According to an embodiment, an apparatus comprises: a buffer memory bank configured to store Transport Data Units ("TDUs"); a link memory bank configured to store linked lists that link TDUs from same Protocol Data Units ("PDUs") together; a free list memory storing a bank free list that identifies locations within the buffer memory bank that are available to store new TDUs; garbage collection logic configured to, when the network switching apparatus drops a PDU that is at least partially buffered in the buffer memory bank, add a linked list of the PDU in the link memory bank to a set of pre-built linked lists; buffer management logic configured to buffer incoming TDUs for incoming PDUs by, for a given incoming PDU: when a pre-built linked list is available in the set of pre-built linked lists, assigning the pre-built linked list to the given incoming PDU and writing incoming TDUs of the given incoming PDU to locations in the buffer memory bank that correspond to addresses of entries within the pre-built linked list, the pre-built linked list thereby linking the incoming TDUs together; and when a pre-built linked list is not available, writing incoming TDUs of the given incoming PDU to locations indicated as available in the bank free list and generating a new linked list in the link memory bank that links the incoming TDUs together.

In an embodiment, the buffer management logic is further configured to associate the pre-built linked lists with source ports, and to select the pre-built linked list to assign to the given incoming PDU based on the pre-built linked list being associated with a first source port from which the given incoming PDU is received.

In an embodiment, the buffer management logic is further configured to store the bank free list as another linked list in the link memory, and to extend the bank free list when the bank free list shrinks below a threshold size by linking a first pre-built linked list to the bank free list.

In an embodiment, the apparatus further comprises buffer read scheduler logic configured to read data for a given PDU, the reading comprising determining locations in the buffer memory bank of TDUs that belong to the given PDU by following a linked list for the given PDU in the link memory bank.

In an embodiment, the buffer management logic is further configured to, when a pre-built linked list is available for a first TDU in a given incoming PDU, update metadata for the given incoming PDU to include a bank head pointer to a current head of the pre-built linked list, and, for each successive incoming TDU of the given incoming PDU that is buffered in the buffer memory bank: write the incoming TDU to a location corresponding to the current head of the pre-built linked list, the current head indicated by a head pointer for the pre-built linked list; set the head pointer for the pre-built linked list to a next entry following the current head.

In an embodiment, the link memory bank is a multi-ported memory bank, the buffer management logic configured to, when dequeuing a first TDU from the buffer memory bank, in a same time slot: read an address of a first buffer entry in which the first TDU is stored from the link memory bank; directly assign the address to a second incoming TDU without reading or writing the address to a bank free list; write the address to the link memory bank at a tail of a linked list that links the second TDU to a PDU to which the second TDU belongs.

In an embodiment, the apparatus further comprises: a packet processor configured to process PDUs prior to sending the PDUs out egress ports to destinations over one or more networks; a traffic manager configured to buffer the PDUs in the buffer memory bank while the PDUs await processing by the packet processor, the traffic manager including the garbage collection logic and buffer management logic; wherein the traffic manager further includes queueing logic that determines when to release TDUs from the buffer memory bank to the packet processor based on queues of the PDUs, wherein upon releasing a given TDU from the buffer memory bank to the packet processor, the buffer management logic is configured to add a given buffer entry in which the given TDU was stored back to the bank free list.

In an embodiment, PDUs that are dropped from the buffer traffic manager are discarded without being forwarded to any packet processor.

In an embodiment, the PDUs are packets and the TDUs are cells.

In an embodiment, each TDU of the TDUs has a corresponding entry within the link memory bank at an address that corresponds to a location within the buffer memory bank that stores at least a portion of the TDU, each of the linked lists formed by a chain of entries within the link memory bank, each non-tail entry in the chain storing a pointer to an address of a next entry in the chain In an embodiment, a given TDU is stored as a set of SDUs across multiple buffer entries in the buffer memory bank, the TDU having an entry in the link memory bank at an address that corresponds to the location of a first SDU in the set.

In an embodiment, the buffer memory bank is one of a plurality of buffer memory banks configured to store TDUs for the PDUs, and the link memory bank is one of a plurality of link memory banks, each of the buffer memory banks having a corresponding link memory bank, each of the linked lists in each of the link memory banks linking only TDUs found in the buffer memory bank that corresponds to the link memory bank.

In an embodiment, the buffer management logic is further configured to, upon assigning all buffer entries indicated by a first pre-built linked list to store TDUs of a first PDU assigned to the pre-built linked list, assign a second pre-built linked list to the first PDU and link the second pre-built linked list to the end of the first pre-built linked list.

According to an embodiment, a method comprises: storing Transport Data Units ("TDUs") in a buffer memory bank of a network switching apparatus; storing, in a link memory bank, linked lists that link TDUs from same Protocol Data Units ("PDUs") together; storing a bank free list that identifies locations within the buffer memory bank that are available to store new TDUs; when the network switching apparatus drops a PDU that is at least partially buffered in the buffer memory bank, adding a linked list for the PDU in the link memory bank to a set of pre-built linked lists; storing first incoming TDUs for a first incoming PDU by assigning a pre-built linked list that is available in the set of pre-built linked lists to the first incoming PDU and writing the first incoming TDUs to locations in the buffer memory bank that correspond to addresses of entries within the pre-built linked list, the pre-built linked list thereby linking the first incoming TDUs together; and storing second incoming TDUs for a second incoming PDU by writing the second incoming TDUs to locations indicated as available in the bank free list and generating a new linked list in the link memory bank that links the second incoming TDUs together.

In an embodiment, the method further comprises: associating the pre-built linked lists with source ports; selecting the pre-built linked list to assign to the first incoming PDU based on the pre-built linked list being associated with a first source port from which the first incoming PDU is received.

In an embodiment, the method further comprises: storing the bank free list as another linked list in the link memory; extending the bank free list when the bank free list shrinks below a threshold size by linking a first pre-built linked list to the bank free list.

In an embodiment, the method further comprises reading data for a given PDU by determining locations in the buffer memory bank of TDUs that belong to the given PDU by following a linked list for the given PDU in the link memory bank.

In an embodiment, the method further comprises, when a pre-built linked list is available for a first TDU in an incoming TDU, updating metadata for the incoming PDU to include a bank head pointer to a current head of the pre-built linked list, and, for each successive incoming TDU of the incoming PDU that is buffered in the buffer memory bank: writing the incoming TDU to a location corresponding to the current head of the pre-built linked list, the current head indicated by a head pointer for the pre-built linked list; setting the head pointer for the pre-built linked list to a next entry following the current head.

In an embodiment, the link memory bank is at least a double-ported memory bank, the method further comprising, when dequeuing a first TDU from the buffer memory bank, in a same time slot: reading an address of a first buffer entry in which the first TDU is stored from the link memory bank; directly assigning the address to a second incoming TDU without reading or writing the address to a bank free list; writing the address to the link memory bank at a tail of a linked list that links the second TDU to a PDU to which the second TDU belongs.

In an embodiment, the method further comprises: processing PDUs with a packet manager prior to send the PDUs out egress ports to destinations over one or more networks; determining when to release TDUs from the buffer memory bank to the packet processor based on queues of the PDUs; upon releasing a given TDU from the buffer memory bank to the packet processor, adding a given buffer entry in which the given TDU was stored back to the bank free list.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 10:
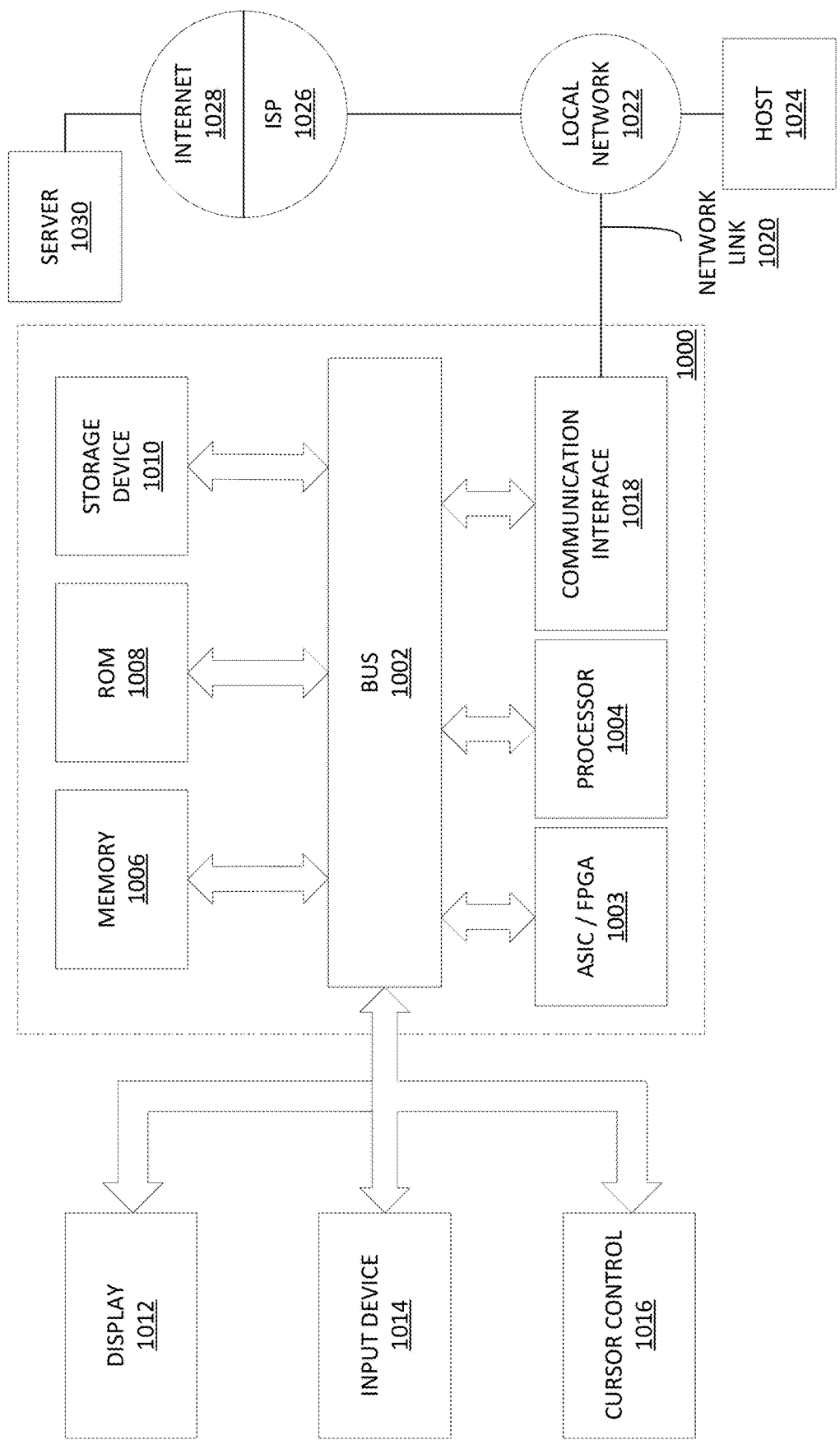
FIG. 10 is block diagram of an example computer system upon which embodiments of the inventive subject matter may be implemented.

FIG. 10 is a block diagram that illustrates an example computer system 1000 that may be utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device. In an embodiment, FIG. 10 constitutes a different view of the devices and systems described in previous sections.

Computer system 1000 may include one or more ASICs, FPGAs, or other specialized circuitry 1003 for implementing program logic as described herein. For example, circuitry 1003 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1000 may include one or more hardware processors 1004 configured to execute software-based instructions. Computer system 1000 may also include one or more busses 1002 or other communication mechanism for communicating information. Busses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes one or more memories 1006, such as a RAM, hardware registers, or other dynamic or volatile storage device for storing data units to be processed by the one or more ASICs, FPGAs, or other specialized circuitry 1003. Memory 1006 may also or instead be used for storing information and instructions to be executed by processor 1004. Memory 1006 may be directly connected or embedded within circuitry 1003 or a processor 1004. Or, memory 1006 may be coupled to and accessed via bus 1002. Memory 1006 also may be used for storing temporary variables, data units describing rules or policies, or other intermediate information during execution of program logic or instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, may optionally be provided and coupled to bus 1002 for storing information and instructions.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 1002.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send and receive data units through the network(s), network link 1020, and communication interface 1018. In some embodiments, this data may be data units that the computer system 1000 has been asked to process and, if necessary, redirect to other computer systems via a suitable network link 1020. In other embodiments, this data may be instructions for implementing various processes related to the described techniques. For instance, in the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

Computer system 1000 may optionally be coupled via bus 1002 to one or more displays 1012 for presenting information to a computer user. For instance, computer system 1000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are optionally coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

As discussed, computer system 1000 may implement techniques described herein using customized hard-wired logic, one or more ASICs or FPGAs 1003, firmware and/or program logic, which in combination with the computer system causes or programs computer system 1000 to be a special-purpose machine. According to one embodiment, however, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network switching apparatus comprising:
a buffer memory bank configured to store Transport Data Units ("TDUs");
a link memory bank configured to store linked lists that link TDUs from same Protocol Data Units ("PDUs") together;
a free list memory storing a bank free list that identifies locations within the buffer memory bank that are available to store new TDUs;
garbage collection logic configured to, when the network switching apparatus drops a PDU that is at least partially buffered in the buffer memory bank, add a linked list of the PDU in the link memory bank to a set of pre-built linked lists;
buffer management logic configured to buffer incoming TDUs for incoming PDUs by, for a given incoming PDU:
when a pre-built linked list is available in the set of pre-built linked lists, assigning the pre-built linked list to the given incoming PDU and writing incoming TDUs of the given incoming PDU to locations in the buffer memory bank that correspond to addresses of entries within the pre-built linked list, the pre-built linked list thereby linking the incoming TDUs together; and
when a pre-built linked list is not available, writing incoming TDUs of the given incoming PDU to locations indicated as available in the bank free list and generating a new linked list in the link memory bank that links the incoming TDUs together.

2. The network switching apparatus of claim 1, wherein the buffer management logic is further configured to associate the pre-built linked lists with source ports, and to select the pre-built linked list to assign to the given incoming PDU based on the pre-built linked list being associated with a first source port from which the given incoming PDU is received.

3. The network switching apparatus of claim 1, wherein the buffer management logic is further configured to store the bank free list as another linked list in the link memory, and to extend the bank free list when the bank free list shrinks below a threshold size by linking a first pre-built linked list to the bank free list.

4. The network switching apparatus of claim 1, further comprising buffer read scheduler logic configured to read data for a given PDU, the reading comprising determining locations in the buffer memory bank of TDUs that belong to the given PDU by following a linked list for the given PDU in the link memory bank.

5. The network switching apparatus of claim 1, wherein the buffer management logic is further configured to, when a pre-built linked list is available for a first TDU in a given incoming PDU, update metadata for the given incoming PDU to include a bank head pointer to a current head of the pre-built linked list, and, for each successive incoming TDU of the given incoming PDU that is buffered in the buffer memory bank:
write the incoming TDU to a location corresponding to the current head of the pre-built linked list, the current head indicated by a head pointer for the pre-built linked list;
set the head pointer for the pre-built linked list to a next entry following the current head.

6. The network switching apparatus of claim 1, wherein the link memory bank is a multi-ported memory bank, the buffer management logic configured to, when dequeuing a first TDU from the buffer memory bank, in a same time slot:
read an address of a first buffer entry in which the first TDU is stored from the link memory bank;
directly assign the address to an incoming second TDU without reading or writing the address to a bank free list;
write the address to the link memory bank at a tail of a linked list that links the second TDU to a PDU to which the second TDU belongs.

7. The network switching apparatus of claim 1, further comprising:
a packet processor configured to process PDUs prior to sending the PDUs out egress ports to destinations over one or more networks;
a traffic manager configured to buffer the PDUs in the buffer memory bank while the PDUs await processing by the packet processor, the traffic manager including the garbage collection logic and the buffer management logic;
wherein the traffic manager further includes queueing logic that determines when to release TDUs from the buffer memory bank to the packet processor based on queues of the PDUs, wherein upon releasing a given TDU from the buffer memory bank to the packet processor, the buffer management logic is configured to add a given buffer entry in which the given TDU was stored back to the bank free list.

8. A method comprising:
storing Transport Data Units ("TDUs") in a buffer memory bank of a network switching apparatus;
storing, in a link memory bank, linked lists that link TDUs from same Protocol Data Units ("PDUs") together;
storing a bank free list that identifies locations within the buffer memory bank that are available to store new TDUs;
when the network switching apparatus drops a PDU that is at least partially buffered in the buffer memory bank, adding a linked list for the PDU in the link memory bank to a set of pre-built linked lists;
storing first incoming TDUs for a first incoming PDU by assigning a pre-built linked list that is available in the set of pre-built linked lists to the first incoming PDU and writing the first incoming TDUs to locations in the buffer memory bank that correspond to addresses of entries within the pre-built linked list, the pre-built linked list thereby linking the first incoming TDUs together; and
storing second incoming TDUs for a second incoming PDU by writing the second incoming TDUs to locations indicated as available in the bank free list and generating a new linked list in the link memory bank that links the second incoming TDUs together.

9. The method of claim 8, further comprising:
associating the pre-built linked lists with source ports;
selecting the pre-built linked list to assign to the first incoming PDU based on the pre-built linked list being associated with a first source port from which the first incoming PDU is received.

10. The method of claim 8, further comprising:
storing the bank free list as another linked list in the link memory;
extending the bank free list when the bank free list shrinks below a threshold size by linking a first pre-built linked list to the bank free list.

11. The method of claim 8, further comprising reading data for a given PDU by determining locations in the buffer memory bank of TDUs that belong to the given PDU by following a linked list for the given PDU in the link memory bank.

12. The method of claim 8, further comprising, when a pre-built linked list is available for a first TDU in an incoming PDU, updating metadata for the incoming PDU to include a bank head pointer to a current head of the pre-built linked list, and, for each successive incoming TDU of the incoming PDU that is buffered in the buffer memory bank:
    writing the incoming TDU to a location corresponding to the current head of the pre-built linked list, the current head indicated by a head pointer for the pre-built linked list;
    setting the head pointer for the pre-built linked list to a next entry following the current head.

13. The method of claim 8, wherein the link memory bank is at least a double-ported memory bank, the method further comprising, when dequeuing a first TDU from the buffer memory bank, in a same time slot:
    reading an address of a first buffer entry in which the first TDU is stored from the link memory bank;
    directly assigning the address to an incoming second TDU without reading or writing the address to a bank free list;
    writing the address to the link memory bank at a tail of a linked list that links the second TDU to a PDU to which the second TDU belongs.

14. The method of claim 8, further comprising:
    processing PDUs with a packet manager prior to send the PDUs out egress ports to destinations over one or more networks;
    determining when to release TDUs from the buffer memory bank to the packet processor based on queues of the PDUs;
    upon releasing a given TDU from the buffer memory bank to the packet processor, adding a given buffer entry in which the given TDU was stored back to the bank free list.

15. One or more non-transitory computer-readable media storing instructions that, when executed by one or more computing devices, cause performance of:
    storing Transport Data Units ("TDUs") in a buffer memory bank of a network switching apparatus;
    storing, in a link memory bank, linked lists that link TDUs from same Protocol Data Units ("PDUs") together;
    storing a bank free list that identifies locations within the buffer memory bank that are available to store new TDUs;
    when the network switching apparatus drops a PDU that is at least partially buffered in the buffer memory bank, adding a linked list for the PDU in the link memory bank to a set of pre-built linked lists;
    storing first incoming TDUs for a first incoming PDU by assigning a pre-built linked list that is available in the set of pre-built linked lists to the first incoming PDU and writing the first incoming TDUs to locations in the buffer memory bank that correspond to addresses of entries within the pre-built linked list, the pre-built linked list thereby linking the first incoming TDUs together; and
    storing second incoming TDUs for a second incoming PDU by writing the second incoming TDUs to locations indicated as available in the bank free list and generating a new linked list in the link memory bank that links the second incoming TDUs together.

16. The one or more non-transitory computer-readable media of claim 15, wherein the instructions, when executed by the one or more computing devices, further cause performance of:
    associating the pre-built linked lists with source ports;
    selecting the pre-built linked list to assign to the first incoming PDU based on the pre-built linked list being associated with a first source port from which the first incoming PDU is received.

17. The one or more non-transitory computer-readable media of claim 15, wherein the instructions, when executed by the one or more computing devices, further cause performance of:
    storing the bank free list as another linked list in the link memory;
    extending the bank free list when the bank free list shrinks below a threshold size by linking a first pre-built linked list to the bank free list.

18. The one or more non-transitory computer-readable media of claim 15, wherein the instructions, when executed by the one or more computing devices, further cause performance of reading data for a given PDU by determining locations in the buffer memory bank of TDUs that belong to the given PDU by following a linked list for the given PDU in the link memory bank.

19. The one or more non-transitory computer-readable media of claim 15, wherein the instructions, when executed by the one or more computing devices, further cause performance of, when a pre-built linked list is available for a first TDU in an incoming PDU, updating metadata for the incoming PDU to include a bank head pointer to a current head of the pre-built linked list, and, for each successive incoming TDU of the incoming PDU that is buffered in the buffer memory bank:
    writing the incoming TDU to a location corresponding to the current head of the pre-built linked list, the current head indicated by a head pointer for the pre-built linked list;
    setting the head pointer for the pre-built linked list to a next entry following the current head.

20. The one or more non-transitory computer-readable media of claim 15, wherein the link memory bank is at least a double-ported memory bank, wherein the instructions, when executed by the one or more computing devices, further cause performance of, when dequeuing a first TDU from the buffer memory bank, in a same time slot:
    reading an address of a first buffer entry in which the first TDU is stored from the link memory bank;
    directly assigning the address to an incoming second TDU without reading or writing the address to a bank free list;
    writing the address to the link memory bank at a tail of a linked list that links the second TDU to a PDU to which the second TDU belongs.

21. The one or more non-transitory computer-readable media of claim 15, wherein the instructions, when executed by the one or more computing devices, further cause performance of:
    processing PDUs with a packet manager prior to send the PDUs out egress ports to destinations over one or more networks;
    determining when to release TDUs from the buffer memory bank to the packet processor based on queues of the PDUs;

upon releasing a given TDU from the buffer memory bank to the packet processor, adding a given buffer entry in which the given TDU was stored back to the bank free list.

* * * * *